US009217210B2

(12) United States Patent
Velev et al.

(10) Patent No.: US 9,217,210 B2
(45) Date of Patent: *Dec. 22, 2015

(54) PROCESS OF MAKING COMPOSITE INORGANIC/POLYMER NANOFIBERS

(75) Inventors: Orlin D. Velev, Cary, NC (US); Stoyan Smoukov, Skokie, IL (US)

(73) Assignee: North Carolina State University, Raleigh, NC (US)

( * ) Notice: Subject to any disclaimer, the term of this patent is extended or adjusted under 35 U.S.C. 154(b) by 609 days.

This patent is subject to a terminal disclaimer.

(21) Appl. No.: 13/473,018

(22) Filed: May 16, 2012

(65) Prior Publication Data

US 2012/0309250 A1    Dec. 6, 2012

Related U.S. Application Data

(63) Continuation-in-part of application No. 12/730,644, filed on Mar. 24, 2010, now Pat. No. 8,551,378.

(60) Provisional application No. 61/162,925, filed on Mar. 24, 2009.

(51) Int. Cl.
C08J 3/11      (2006.01)
D01D 5/18      (2006.01)
(Continued)

(52) U.S. Cl.
CPC ................ *D01F 1/10* (2013.01); *B29C 47/122* (2013.01); *B29C 55/00* (2013.01); *C04B 35/6225* (2013.01); *C04B 35/6264* (2013.01);
(Continued)

(58) Field of Classification Search
CPC ..... B29C 47/0014; B29C 47/122; C08F 6/00; C08J 3/11; D01D 5/003; D01D 5/0038; D01D 5/0046; D01D 5/18; D01D 5/40

USPC ................ 264/10, 211.1, 464, 465, 466, 484; 528/502 F

See application file for complete search history.

(56) References Cited

U.S. PATENT DOCUMENTS 2,988,782 A    6/1961    Parrish et al.
3,743,272 A    7/1973    Nowotny et al.
(Continued)

FOREIGN PATENT DOCUMENTS

JP    2004285538 A    10/2004
WO    2008157521 A    12/2008

OTHER PUBLICATIONS

Alargova, R. G., K. H. Bhatt, V. N. Paunov, and O. D. Velev. "Scalable Synthesis of a New Class of Polymer Microrods by a Liquid-Liquid Dispersion Technique." Advanced Materials 16.18 (2004): 1653-657.

(Continued)

*Primary Examiner* — Leo B Tentoni
(74) *Attorney, Agent, or Firm* — Michael Best & Friedrich LLP

(57) ABSTRACT

Nanofibers are fabricated by introducing a mixture of a polymer solution and inorganic precursor into a dispersion medium and shearing the mixture. Liquid strands, streaks or droplets of the mixture are spun into elongated fibers that include inorganic fibrils. The resulting composite inorganic/polymer fibers may be provided as an end product. Alternatively, the polymer may be removed to liberate the inorganic fibrils, which may be of the same or smaller cross-section as the polymer fibers and may be provided as an end product.

16 Claims, 9 Drawing Sheets

(51) Int. Cl.
| | |
|---|---|
| *D01F 1/10* | (2006.01) |
| *B29C 47/12* | (2006.01) |
| *B29C 55/00* | (2006.01) |
| *D01D 5/40* | (2006.01) |
| *D01F 9/08* | (2006.01) |
| *C04B 35/622* | (2006.01) |
| *C04B 35/626* | (2006.01) |
| *C04B 35/634* | (2006.01) |
| *C04B 35/638* | (2006.01) |

(52) U.S. Cl.
CPC ..... *C04B35/62236* (2013.01); *C04B 35/62259* (2013.01); *C04B 35/638* (2013.01); *C04B 35/63432* (2013.01); *D01D 5/40* (2013.01); *D01F 9/08* (2013.01); *C04B 2235/441* (2013.01); *C04B 2235/5264* (2013.01); *C04B 2235/765* (2013.01); *Y10T 428/2913* (2015.01); *Y10T 442/698* (2015.04)

(56) References Cited

U.S. PATENT DOCUMENTS

| | | | |
|---|---|---|---|
| 3,902,957 | A | 9/1975 | Kozlowski |
| 3,995,001 | A | 11/1976 | Vroomans et al. |
| 3,997,648 | A | 12/1976 | Davis et al. |
| 4,013,751 | A | 3/1977 | Davis et al. |
| 4,020,266 | A | 9/1977 | Frank et al. |
| 4,048,429 | A | 9/1977 | van der Berg et al. |
| 4,127,624 | A | 11/1978 | Keller et al. |
| 4,134,931 | A | 1/1979 | Hayes, Jr. et al. |
| 4,198,461 | A | 4/1980 | Keller et al. |
| 4,224,259 | A | 9/1980 | Sander et al. |
| 4,274,917 | A | 6/1981 | Murphy et al. |
| 4,511,623 | A | 4/1985 | Yoon et al. |
| 5,460,498 | A | 10/1995 | Steel et al. |
| 6,291,013 | B1 | 9/2001 | Gibson et al. |
| 6,365,173 | B1 | 4/2002 | Domb et al. |
| 7,323,540 | B2 | 1/2008 | Velev et al. |
| 7,390,760 | B1 | 6/2008 | Chen et al. |
| 7,575,707 | B2 | 8/2009 | Xia et al. |
| 8,551,378 | B2 | 10/2013 | Velev et al. |
| 2008/0003168 | A1 | 1/2008 | Barrero Ripoll et al. |
| 2010/0247908 | A1 | 9/2010 | Velev et al. |
| 2011/0266213 | A1 | 11/2011 | Jo et al. |
| 2013/0012598 | A1 | 1/2013 | Velev et al. |
| 2014/0332733 | A1* | 11/2014 | Joo et al. ................ 264/465 X |

OTHER PUBLICATIONS

Alargova, Rossitza G., Vesselin N. Paunov, and Orlin D. Velev. "Formation of Polymer Microrods in Shear Flow by Emulsification—Solvent Attrition Mechanism." Langmuir 22.2 (2006): 765-74.

International Preliminary Report and Written Opinion for PCT/US2012/038162 dated Dec. 12, 2014.

Suryo, Ronald, and Osman A. Basaran. "Tip Streaming from a Liquid Drop Forming from a Tube in a Co-flowing Outer Fluid." Physics of Fluids 18.8 (2006): 082102.

Eggleton, Charles, Tse-Min Tsai, and Kathleen Stebe. "Tip Streaming from a Drop in the Presence of Surfactants." Physical Review Letters 87.4 (2001) 048302(4).

Sutti et al. "Sher-Enhanced Solution Precipitation: A Simple Process to Produce Short Polymeric Nanofibers." Journal of Nanoscience and Nanotechnology 11, pp. 8947-8952 (Oct. 2011).

Perry, R.H. and Green, D. Perry's Chemical Engineer's Handbook, International Edition 1984, pp. (4-24)-(4-27) (1984).

Mercader et al., "Kinetics of fiber solidification." Proceedings of the National Academy of Science in the United States of America (PNAS), 107, PNAS Early Edition pp. 1-5 (Oct. 4, 2010).

Kinahan et al., "Tunable Silk: Using Microfluidics to Fabricate Silk Fibers with Controllable Properties." Biomacromolecules, 12, pp. 1504-1511 (May 9, 2011).

Third Party Submission under 37 CFR 1.290 for U.S. Appl. No. 13/473,327 dated Apr. 29, 2014.

International Search Report for PCT/US2012/038162 dated Feb. 22, 2013.

Kalinova et al. "Nanofibrous ResonantMembrane for Acoustic Applications" J. Nanomaterials ID 265720 6pp, (2011).

Mabille et al., Europhys. Lett., 2003, 61, 708.

Sugiura et al., J. Phys. Chem. B, 2002, 106, 9405.

Rallison, Annu. Rev. Fluid Mech., 1984, 16, 45.

Li, Phys. Fluids, 2000, 12, 269.

Grace, Chem. Eng. Commun., 1982, 14, 225 (Reprint attached).

Taylor, Phil. Trans. R. Soc. Lond. A-Math. Phys. Sci., 1923, 223, 289.

Chandrasekhar, Proc. Royal Soc. London Ser. A-Math. Phys. Sci., 1962, 265, 188.

Snyder, Proc. Royal Soc. London Ser. A-Math. Phys. Sci., 1962, 265, 198.

United States Patent Office Action for U.S. Appl. No. 12/730,644 dated Nov. 2, 2012 (7 pages).

United States Patent Office Action for U.S. Appl. No. 12/730,644 dated Mar. 13, 2013 (11 pages).

United States Patent Office Notice of Allowance for U.S. Appl. No. 12/730,644 dated Jul. 22, 2013 (6 pages).

United States Patent Office Action for U.S. Appl. No. 13/473,327 dated Feb. 9, 2015 (6 pages).

* cited by examiner

PROCESS OF MAKING COMPOSITE INORGANIC/POLYMER NANOFIBERS

RELATED APPLICATIONS

This application is a continuation-in-part of U.S. patent application Ser. No. 12/730,644, filed Mar. 24, 2010, titled "NANOSPINNING OF POLYMER FIBERS FROM SHEARED SOLUTIONS", now U.S. Pat. No. 8,551,378, which claims the benefit of U.S. Provisional Patent Application Ser. No. 61/162,925, filed Mar. 24, 2009, titled "NANOSPINNING OF POLYMER FIBERS FROM SHEARED SOLUTIONS", the contents of which are incorporated by reference herein in their entireties.

FEDERALLY SPONSORED SUPPORT

This invention was made with government support under Grant No. 0927554 awarded by the National Science Foundation. The government has certain rights in the invention.

TECHNICAL FIELD

The present invention relates generally to nanofibers and processes for making them. More specifically, the invention relates to nanofibers having an inorganic component formed by a process where a polymer solution, or a mixture with or without additives and reactive precursors, is sheared in viscous liquid.

BACKGROUND

Fibers form, in part or in whole, a large variety of both consumer and industrial materials such as, for example, clothing and other textile materials, medical prostheses, construction materials and reinforcement materials, and barrier, filtration and absorbent materials. There are two main structural classes of fiber materials: woven and non-woven. An advantage of non-woven fiber materials is their lower production cost.

Nanofibers are increasingly being investigated for use in various applications. Nanofibers may attain a high surface area comparable with the finest nanoparticle powders, yet are fairly flexible, and retain one macroscopic dimension which makes them easy to handle, orient and organize. Moreover, the high surface area of nanofibers may facilitate the addition of particles that improve the properties of the nanofibers such as mechanical strength, and/or impart additional functionality such as therapeutic activity, catalytic activity, or microelectronic/optoelectronic functionality.

In the use of nanofibers for applications such as those noted above, high volume and low production cost are generally desirable to achieve commercial viability. Five general methods for the production of fibers with nanometer or single-micron diameters exist: drawing, phase separation, electrospinning, template synthesis and self-assembly. Of these, melt blowing, splitting/dissolving of bicomponent fibers, and electrospinning have shown a potential for commercial-scale fiber production. The first two techniques are based on mechanical drawing of melts and are well-established in high-volume manufacturing. In melt blowing polymers are extruded from dies and stretched to smaller diameters by heated, high velocity air streams. Bicomponent spinning involves extrusion of two immiscible polymers and two-step processing: (1) melt spinning the two polymer melts through a die with a "segmented pie" or "islands-in-the-sea" configuration, followed by solidification and (2) release of small filaments by mechanically breaking the fiber or by dissolving one of the components. A disadvantage of these techniques is that they are limited to melt-processable polymers.

Many polymers of commercial interest, including acrylics and especially polymers that are biocompatible and biodegradable, are only processed from their solution. So far no commercial solution spinning method has been developed for creating nanofibers from such polymers. The two main types of solution spinning, dry-spinning and wet spinning, like melt spinning, also involve extrusion of the polymer through an orifice. In dry-spinning the polymer is then drawn through air at elevated temperature while the solvent evaporates. In wet-spinning the fiber is then drawn in a coagulation bath.

Electrospinning differs from melt or dry spinning by the physical origin of the electrostatic rather than mechanical forces being used to draw the fibers. Among these three techniques, electrospinning can produce the smallest fibers (20-2000 nm in diameter), and to date has been the only technique that can produce sub-micron fibers from most polymers. However, low production rate is a major disadvantage of this technique. For the wide commercialization of nanofibers there is a need for a method capable of several orders of magnitude higher productivity.

It would also be desirable to create nanofibers that are organic/inorganic composites. However, organic and inorganic materials are conventionally made and used separately because of their widely differing precursor chemistries and synthesis procedures. Inorganic materials are typically produced as thin films via vacuum deposition processes, or in some cases as particles via colloidal synthesis. It would be desirable to produce composite nanofibers by way of an integrated process.

Accordingly, an ongoing need remains for improved techniques for fabricating nanofibers. There is also a need for fabricating composite inorganic/organic nanofibers and pure inorganic nanofibers.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method for fabricating polymer nanofibers includes introducing a polymer solution into a dispersion medium and shearing the polymer solution. Dispersed-phase components of the polymer solution, such as, for example liquid streaks, strands or droplets, of the polymer solution are spun into elongated fibers that are insoluble in the dispersion medium.

According to another implementation, a method for fabricating composite inorganic/polymer nanofibers includes introducing a mixture of a polymer solution and an inorganic precursor into a dispersion medium and shearing the mixture. Dispersed-phase components of the mixture are spun into elongated fibers that include inorganic fibrils.

In some implementations, the inorganic fibrils are liberated from the polymer matrix by, for example, treating the elongated fibers that include the inorganic fibrils to a calcination, chemical treatment, or energy addition process, thereby forming pure or isolated inorganic fibrils. The inorganic fibrils may be of the same cross section size as the original fibers, or may be of much smaller cross section sizes due to longitudinal phase separation of the inorganic component.

A wide variety of polymers and inorganic precursors may be utilized as starting materials, examples of which are given below.

According to another implementation, a polymer, composite, or inorganic nanofiber material is provided. In some implementations, the material may be fabricated by introducing a solution or solution/dispersion mixture into a dispersion medium and shearing the dispersion medium. The nanofiber material may be incorporated into various products, structures or devices, and/or be utilized for various functions or purposes.

According to another implementation, a composite inorganic/polymer nanofiber material that includes inorganic fibrils is provided.

In some implementations, the polymer, composite, or inorganic nanofiber material is provided in the form of one or more nanofibers, a nonwoven article that includes a plurality of nanofibers, or a yarn that includes a plurality of twisted nanofibers.

According to another implementation, an inorganic nanofiber, or "fibril," is provided.

According to another implementation, an apparatus for fabricating polymer nanofibers is provided. The apparatus may include a means, structure or device for containing a dispersion medium, a means, structure or device for adding a fiber precursor solution to the dispersion medium, and a means, structure or device for shearing the fiber precursor solution. In some implementations, the means, structure or device for containing the dispersion medium includes one or more cylinders, and the means, structure or device for shearing the fiber precursor solution includes a surface that rotates relative to another surface. In some implementations, the means, structure or device for shearing the fiber precursor solution includes a cylinder that rotates relative to another cylinder.

In various implementations, the apparatus may include a means, structure or device for controlling the amount of shear stress or force applied, a means, structure or device for separating, collecting and/or organizing the (nano) fibers formed, and various combinations of two or more of the foregoing structures or devices.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 4A shows short polymer rods formed from the 5.8 k molecular weight (MW) polymer, and FIG. 4B shows long fibers formed from the 230 k MW polymer.

FIG. 5B is a log-log plot of zero-shear viscosity (specific viscosity $\eta_{sp}$) of a series of solutions of varying concentrations $C_n$ (M) of styrene monomers; the entanglement concentration is located at the intersection of the two straight power-law regions. FIG. 5C plots fiber diameter (μm) as a function of angular velocity ω (rpm) of a rotating shearing element of a device such as illustrated in FIG. 1, demonstrating the effect of shear stress τ, as shown, the average fiber diameter and distribution decrease with increasing angular velocity ω. FIG. 5D plots fiber diameter (μm) as a function of ethanol concentration (v/v %), demonstrating the effect of shearing medium composition provided in a device such as illustrated in FIG. 1. Increasing the ethanol (antisolvent) concentration significantly increased both the diameter and polydispersity of the fibers. The bars denote the 10-90% range, the denote the 25-75% range, and the lines denote the average diameter in the size distribution.

FIGS. 6A and 6B show typical fibers produced; the diameters ranged from ~200 nm to ~2 μm and the average size was ~500 nm. FIG. 6C shows a rare broken fiber with a void space in its interior. Cross-sectional SEM and TEM imaging showed fiber interiors were solid polymer. FIG. 6D indicates that approximately 5% of the fibers have an uneven surface, which upon closer examination was considered to be due to a series of closely-spaced necking deformations with constant diameter sections in between. FIGS. 6E and 6F show the cross-section of fibers after fracturing in liquid nitrogen. Larger fibers with diameters >~1 μm have a few small pores (FIG. 6E), but no such pores are observed in smaller fibers (FIG. 6F).

FIG. 8A is a SEM micrograph of PS fibers formed from 15% solution (w/w in $CHCl_3$) sheared into 75% glycerol:25% ethanol at 2000 rpm. FIG. 8B is a high-resolution SEM micrograph of the fibers shown in Figure A. FIGS. 8C and 8D are optical and SEM micrographs of cellulose acetate (CA) microfibers, produced by shearing a 10% CA solution (w/w in acetone) into a medium with 75% glycerol: 25% water (v/v) at 2000 rpm for 2 min. FIG. 8E shows poly-lactic acid fibers (PLA), produced by shearing a 1% PLA solution (w/w in $CHCl_3$) into a medium with 37% glycerol:63% ethanol (v/v) at 2000 rpm for 8 min. FIG. 8F is a TEM micrograph of a composite PS fiber containing 50 nm magnetite ($Fe_3O_4$) nanocubes. The fibers were produced by shearing a PS solution (10% w/w in $CHCl_3$, containing ~0.5% w/w $Fe_3O_4$ nanocubes) into a 75% glycerol:25% ethanol medium at 2000 rpm for 3 min.

FIG. 9A is a SEM micrograph of PS/$TiO_2$ composite fibers obtained by shearing chloroform solutions of PS (13.5% w/w) and Ti(IV)isopropoxide (TIPP) (7.6% w/w) in a medium of 75% glycerol and 25% EtOH, with the scale bar=20 μm. FIG. 9B is a TEM micrograph of the fibers shown in FIG. 9B, showing stripes of varying electron density in the composite fibers, with the scale bar=500 nm. FIG. 9C is a SEM micrograph of the composite fibers shown in FIGS. 9A and 9B after calcination in air at 515° C. for 18 hrs, with the scale bar=5 μm. After removing all the polystyrene from the composites, only titania nanofibers remain. FIG. 9D is an XRD spectrum (intensity (counts) as a function of 2θ (degrees)) of the titania nanofibers show they are composed of anatase. All the peaks are referenced to specific anatase diffraction planes.

DETAILED DESCRIPTION

Figure 1:
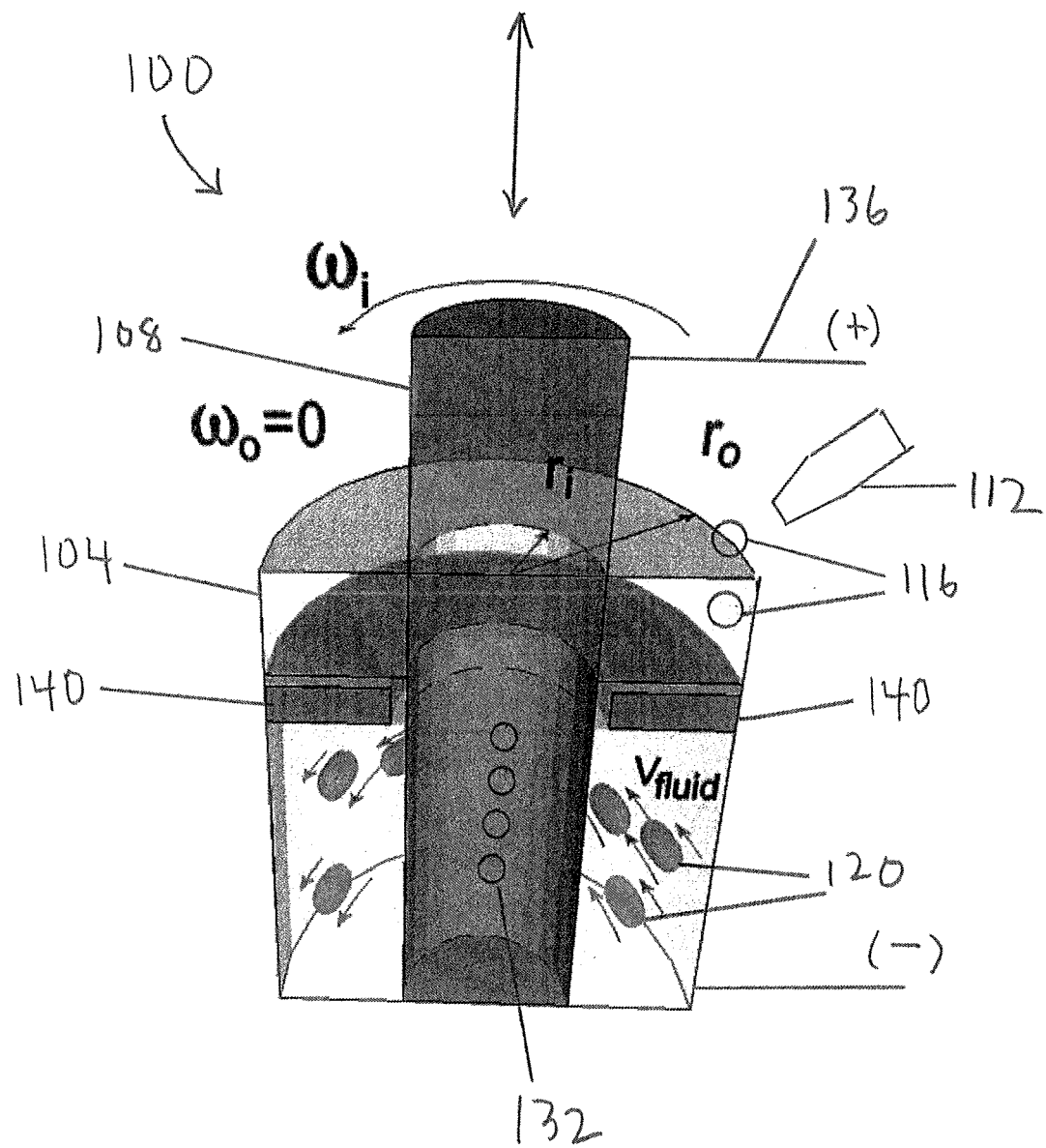
FIG. 1 is a cross-sectional view of an example of an apparatus or system that may be utilized for fabricating nanofibers in accordance with certain implementations of the present disclosure.

As used herein, the term nanofiber refers generally to an elongated fiber structure having an average diameter ranging from less than 50 nm to 5000 nm or greater. In some examples, the average diameter may range from 40 nm to 5000 nm. The "average" diameter may take into account not only that the diameters of individual nanofibers making up a plurality of nanofibers formed by implementing the presently disclosed method may vary somewhat, but also that the diameter of an individual nanofiber may not be uniform over its length in some implementations of the method. In various examples, the average length of the nanofibers may be a high as millions of nm. In various examples, the aspect ratio (length/diameter) of the nanofibers may be a high as millions. In some specific examples, we have demonstrated nanofibers with aspect ratios of at least 10,000. Insofar as the diameter of the nanofiber may be on the order of a few microns or less, for convenience the term "nanofiber" as used herein encompasses both nano-scale fibers and micro-scale fibers (microfibers).

As used herein, the term nanorod refers generally to a structure having an aspect ratio (length/diameter) of less than 100.

As used herein, the term fibril refers generally to an elongated fiber structure having an average diameter ranging from about 1 nm-1,000 nm in some examples, in other examples ranging from about 1 nm-500 nm, and in other examples ranging from about 25 nm-250 nm. According to certain methods described below, fibrils are formed by phase separation from nanofibers. In these methods, the diameter of a fibril is generally smaller than the diameter of the nanofiber with which it is associated, and typically smaller by an order of magnitude. In these methods, a fibril may be composed of an inorganic precursor or an inorganic compound. Fibrils may also be characterized as nanofibers. In the present disclosure, the term "fibrils" distinguishes these structures from the polymer nanofibers utilized to form the inorganic fibrils. The length of the fibrils may be about same as the polymer nanofibers or may be shorter.

As used herein, the term inorganic precursor refers to any compound from which an inorganic compound may be formed (derived, produced, synthesized, etc.), with or without the use of a reagent, catalyst, or addition of energy. As one non-limiting example, titanium isopropoxide, or Ti(OCH$(CH_3)_2)_4$, is an inorganic precursor for titania (titanium (IV) oxide, or $TiO_2$). Titanium isopropoxide may, for example, be reacted with water to form titania.

As used herein, the term microparticle or nanoparticle refers to any particle that may form a composite with a nanofiber fabricated in accordance with the present teachings. The average size of nanoparticles may range from 1 to 100 nm or greater. More generally, the average size of microparticles or nanoparticles may range from 0.5 nm to 10 μm. In the present context, the term "size" takes into account the fact that the nanoparticles may exhibit irregular shapes such that "size" corresponds to the characteristic dimension of the nanoparticles. For example, if the shapes of the nanoparticles are approximated as spheres, the characteristic dimension may be considered to be a diameter. As another example, if the shapes of the nanoparticles are approximated as prisms or polygons (i.e., rectilinear dimensions), the characteristic dimension may be considered to be a predominant length, width, height, etc. For convenience, the terms "nanoparticle," "microparticle" and "particle" are used interchangeably to encompass both nanoparticles and microparticles, unless specified otherwise.

As used herein, the terms "anti-solvent" and "coagulant" are used interchangeably unless specified otherwise.

The present disclosure describes efficient and scalable methods for processing fiber precursor solutions into nanofibers, which combines phase separation and shear forces. In some implementations, the fiber precursor solutions are polymer solutions. In one aspect, the method may be characterized as entailing a bulk process of antisolvent-induced precipitation under shear stress in viscous media. This approach differs significantly from existing technologies for creating nanofibers (e.g., electrospinning, bicomponent splitting, and melt-blowing) and overcomes a number of their limitations. This process does not rely on nozzles for polymer extrusion and therefore overcomes the major limitations of wet-spinning in terms of high feeding pressures, nozzle blockage, and use of particulate additives. Thus, the method may advantageously be employed for producing composite fibers incorporating nanoparticles and/or other additives and material precursors. Moreover, the process takes place in the bulk volume of the medium liquid, and a massive number of fibers may be formed in parallel at the same time. Thus, the process is scalable and can be tailored to produce fibers of a wide variety of polymers, composites and inorganic materials with diameters and lengths typically falling within the ranges indicated above.

In other implementations, the fiber precursor solutions are mixtures (or blends) of polymer solutions and inorganic precursors. Thus, the present disclosure also describes efficient and scalable methods for fabricating composite inorganic/polymer nanofibers that include inorganic fibrils in each polymer nanofiber. This method also entails antisolvent-induced precipitation under shear stress in viscous media. Additionally, inorganic fibrils are formed via phase separation from the polymer nanofibers. The composite nanofibers may additionally incorporate nanoparticles and/or other additives and material precursors. In some implementations, the inorganic fibrils may be isolated from the polymer fraction whereby the inorganic fibrils may be provided as an end product.

Polymer Nanofibers

According to various implementations, polymer nanofibers are provided. Methods disclosed herein for fabricating the polymer nanofibers entail the use of shear stresses in a liquid-liquid dispersion system (or bi-phase liquid dispersion system) to form and stretch nanofibers. Operationally, the actual formation of these nanofibers may be considered as being accomplished in just one or two steps, although the formation process may also be considered as entailing various sub-steps or events. According to certain implementations, a polymer solution is introduced into a dispersion medium (also termed a shearing medium herein). Any means for introducing, injecting or inserting the polymer solution may be employed (e.g., syringe, tube, orifice, nozzle, etc.). The polymer solution includes a polymer dispersed in any solvent ("polymer solvent") capable of dissolving the polymer and forming a stable solution. Optionally, the polymer solution may additionally include one or more additives for various purposes such as, for example, to impart or enhance a certain function or property of the nanofibers being formed, to facilitate the process by which the nanofibers are formed, etc. The dispersion medium generally should be sufficiently viscous as to enable through shear and elongation the nanofiber formation in the manner described herein. In particular, the viscosity of the dispersion medium should be high enough to provide a sufficiently high shear stress $\tau=\mu G$ for a given shear rate G. Additionally, the dispersion medium is or includes a component that behaves as an anti-solvent for the polymer of the polymer solution that causes the polymer to precipitate out of solution. The anti-solvent should be sufficiently miscible with the polymer solvent as to enable the nanofiber formation in the manner described herein. The polymer solution resides in the dispersion medium in the form of a dispersed phase comprising a plurality of dispersed-phase components (or dispersed-phase units, or dispersed-phase species) that are dispersed throughout the volume of the dispersion medium. This results in a dispersion system comprising the dispersed-phase components (collectively, the dispersed phase) and the dispersion medium. The dispersed-phase components may be in the form of liquid streaks, liquid strands, and/or liquid droplets of various shapes and shape ratios. Accordingly, in the present disclosure the terms dispersed-phase components, streaks, strands, and droplets are used interchangeably unless specified otherwise. Depending on the nature of the polymer solution and the manner in which it is introduced, the polymer solution may enter the dispersion medium already in the form of dispersed-phase components or may enter in a continuous stream and break up into dispersed-phase components in the dispersion medium.

During the introduction of the polymer solution into the dispersion medium, the dispersion system (and more particularly the dispersed-phase components of the polymer solution present in the dispersion medium) is sheared. Any means or device may be utilized to impart a shearing action to the dispersed-phase components in a batch or continuous process. In certain implementations, one or more surfaces confining the volume of the dispersion medium may be moved (e.g., rotated, translated, twisted, etc.) relative to one or more stationary or other moving surfaces. The shearing of the dispersion system deforms the dispersed-phase polymer solution into liquid filament streams due to capillary instabilities. These filaments are further stretched under a mechanism of shear-force elongation. At the same time, the polymer solvent, being miscible with the dispersion medium, diffuses out from the dispersed-phase components/filaments and into the dispersion medium. As a result, insoluble nanofibers composed of the polymer are formed. From the point in time at which the polymer solution begins to be added to the dispersion medium, the duration of time required to the form nanofibers in a batch process is typically on the order of less than a few seconds to more than a few tens of seconds. In an apparatus such as described below with 6 ml volume, fibers may be formed at a rate of up to 0.1 g/min. Generally, the production rate should scale with the volume of the apparatus and/or shear fluid flux or volume.

Optionally, the as-formed nanofibers may be composites that include nanoparticles, microparticles or other additives retained by the polymer component. In the present context, the term "retained" indicates that such nanoparticles, microparticles or other additives may be disposed on the outer surface of, and/or embedded in (or encapsulated by) the polymer component. Such nanoparticles, microparticles or other additives would typically be included in the polymer solution introduced into the dispersion medium. More generally, depending at least in part on the type of nanoparticles, microparticles or other additives, they may be introduced before or during shearing such as by being dispersed in the polymer solution or by being introduced into the dispersion medium separately from the polymer solution. Alternatively, the nanoparticles, microparticles or other additives may be introduced after shearing such as by being introduced into the dispersion medium while the as-formed nanofibers are still resident in the dispersion medium, or by being added to the nanofibers by any suitable manner (e.g., coating, vapor deposition, etc.) after the nanofibers have been separated from the dispersion medium.

Once the nanofibers have been formed as described above, the nanofibers may be removed from the apparatus and subjected to any desired post-fabrication procedures. For instance, the as-formed nanofibers may be subsequently washed with a low-viscosity anti-solvent, collected, and dried. The nanofibers may be utilized to produce nonwoven webs for various applications. The anti-solvent may be recycled and re-circulated to the apparatus after the polymer fibers are separated from the suspension. Additionally, the nanofibers may be processed or utilized as needed to fabricate any desired end-product.

A notable advantage of the present method is that it is not limited to the use of any particular polymer or class of polymers. Polymers encompassed by the present disclosure generally may be any naturally-occurring or synthetic polymers capable of being fabricated into nanofibers in accordance with the shear-driven nanospinning technique taught herein. Non-limiting examples of polymers include many high molecular weight (MW) solution-processable polymers such as polyethylene (more generally, various polyolefins), polystyrene, cellulose, cellulose acetate, poly(L-lactic acid) or PLA, polyacrylonitrile, polyvinylidene difluoride, conjugated organic semiconducting and conducting polymers, biopolymers such as polynucleotides (DNA) and polypeptides, etc. In typical implementations of the present method, linear high-MW polymers have a MW ranging from ~20,000-30,000 Da or greater for formation of high-aspect ratio fibers. In other implementations, a MW ranging from about 15,000 Da or greater may be sufficient for formation of high-aspect ratio fibers. In other implementations, a MW ranging from about 10,000 Da or greater may be sufficient for formation of high-aspect ratio fibers. Generally, higher MW ranges would likely be required for branched polymers. More generally, any molecular weight could be used without departing from the invention, including below 10,000.

Other examples of suitable polymers include vinyl polymers such as, but not limited to, polyethylene, polypropylene, poly(vinyl chloride), polystyrene, polytetrafluoroethylene, poly(α-methylstyrene), poly(acrylic acid), poly(isobutylene), poly(acrylonitrile), poly(methacrylic acid), poly(methyl methacrylate), poly(1-pentene), poly(1,3-butadiene), poly(vinyl acetate), poly(2-vinyl pyridine), 1,4-polyisoprene, and 3,4-polychloroprene. Additional examples include non-vinyl polymers such as, but not limited to, poly(ethylene oxide), polyformaldehyde, polyacetaldehyde, poly(3-propionate), poly(10-decanoate), poly(ethylene terephthalate), polycaprolactam, poly(11-undecanoamide), poly(hexamethylene sebacamide), poly(m-phenylene terephthalate), poly(tetramethylene-m-benzenesulfonamide). Additional polymers include those falling within one of the following polymer classes: polyolefin, polyether (including all epoxy resins, polyacetal, polyetheretherketone, polyetherimide, and poly(phenylene oxide)), polyamide (including polyureas), polyamideimide, polyarylate, polybenzimidazole, polyester (including polycarbonates), polyurethane, polyimide, polyhydrazide, phenolic resins, polysilane, polysiloxane, polycarbodiimide, polyimine, azo polymers, polysulfide, and polysulfone.

As noted above, the polymer can be synthetic or naturally-occurring. Examples of natural polymers include, but are not limited to, polysaccharides and derivatives thereof such as cellulosic polymers (e.g., cellulose and derivatives thereof as well as cellulose production byproducts such as lignin) and starch polymers (as well as other branched or non-linear polymers, either naturally occurring or synthetic). Exemplary derivatives of starch and cellulose include various esters, ethers, and graft copolymers. Other examples of natural biopolymers include chitin, chitosan and their derivatives, alginates, xantans and various gums. The polymer may be crosslinkable in the presence of a multifunctional crosslinking agent or crosslinkable upon exposure to actinic radiation or other type of radiation. The polymer may be homopolymers of any of the foregoing polymers, random copolymers, block copolymers, alternating copolymers, random tripolymers, block tripolymers, alternating tripolymers, derivatives thereof (e.g., graft copolymers, esters, or ethers thereof), and the like.

As indicated above, the polymer solvent may generally be any solvent capable of dissolving the polymer being processed, and which is completely or partially miscible with the antisolvent dispersion medium to a degree sufficient for forming nanofibers in accordance with the present teachings. Complete or full miscibility generally means that two (or more) liquids are miscible with each other in all proportions. Partial miscibility generally means that the degree to which the two (or more) liquids are miscible with each other is not necessarily the same. Typically, partially miscible solvents have a solubility in each other of at least 5 g/L at 25° C. For convenience, the term "miscible" as used herein encompasses partial miscibility as well as full miscibility, consistent with the foregoing statements. Non-limiting examples of polymer solvents include chloroform ($CHCl_3$), acetone, toluene, tetrahydrofuran (THF), formic acid, acetic acid, dimethylformamide (DMF), dimethylacetamide (DMAc), dichloromethane (DCM), ethanol, ethylene glycol (EG) and glycol derivatives, and other polar and non-polar organic solvents, water, water with varied pH values, water with varied salt concentration, dissolved and supercritical carbon dioxide, mixtures of two or more of the foregoing, and mixtures of one or more of the foregoing with other solvents.

Polymer solution concentrations typically range from 0.1 wt % to over 50 wt %, with generally lower wt % for higher MW polymers in order to achieve the optimal viscosities. More generally, however, the polymer solution concentration will depend on the polymer type and molecular weight.

As indicated above, the dispersion medium may generally include any component or components that serve as an anti-solvent for the polymer being processed, but which is miscible with the polymer solvent being utilized. Stated in another way, the anti-solvent may be any liquid or solution in which the polymer does not dissolve, which may include the dispersion medium itself or specific additives. Non-limiting examples of dispersion media include various alcohols such as ethanol, methanol, isopropanol, glycerol or the like, and combinations of two or more alcohols such as glycerol/ethanol, as well as water. As an example, glycerol may be included to control the viscosity of the dispersion medium, with ethanol or water also included for its miscibility with the polymer solvent to provide a pathway for the polymer solvent to leave the fibers whereby the fibers can be stably formed. Various biopolymers, biomacromolecules, conditioners and thickeners may also be used to adjust the media viscosity.

In advantageous implementations, the viscosity of the dispersion medium ranges from about 1 cP or greater. In other implementations, the viscosity of the dispersion medium ranges from about 1 cP to 1500 cP (or higher). In advantageous implementations, the ratio $p=\mu_1/\mu_2$ of the viscosities of polymer solution and the dispersion medium ranges from ~0.1 to 200.

In advantageous implementations, the shear stress applied to the dispersion medium while the polymer solution is added and the nanofibers are being formed ranges from about 10 Pa to 1000 Pa. In some specific examples demonstrated herein, the applied shear stress ranges from ~30 to ~100 Pa.

The insolubility of the polymer in the dispersion medium may be characterized in advantageous implementations as the polymer having a solubility in the anti-solvent of (or comprising) the dispersion medium of less than about 2 g/L at 25° C., preferably less than about 1 g/L, more preferably less than about 0.5 g/L, and most preferably less than about 0.1 g/L.

The concentration of the antisolvent medium will generally depend on the polymer-antisolvent interactions as well as the polymer-solvent interactions. For a system where the polymer is barely soluble in the solvent, minute amounts of antisolvent would be sufficient for the formation of fibers.

As noted above, an advantage of the method disclosed herein is that it does not require the use of nozzles. This feature enables the incorporation of additives without the risk of clogging a nozzle or unduly increasing the operating pressure of extrusion. Examples of possible additives include, but are not limited to, ceramics such as titania, alumina, zirconia and various clays, silica, glasses, bioceramics, bioactive glasses, metals (e.g., silver, gold, etc.), metal alloys, metal oxides, metalloids (e.g., silicon, germanium, semiconductor and quantum dot forming materials etc.) and their oxides, graphite, carbon black, various graphene nanosheets and carbon nanotubes (CNTs). Additives may be included for various purposes such as imparting to or enhancing a property or function of the nanofiber, for example strength, anti-bacterial activity, therapeutic activity (e.g., pharmaceutical drug crystals), conductivity, semiconductivity (e.g., quantum dots, semiconductor nanoparticles), magnetic behavior, porosity, hydrophobicity, selective permeability, selective affinity to various materials, adhesiveness, enzymatic or catalytic activity, biocompatibility, biodegradability, biological adhesion, biological recognition and/or binding, chemical inertness, polarity, selective retention and/or enrichment of analytes in analytical separation techniques, etc. As one example, high molecular-weight polyethylene, known for its strength, could be strengthened by the incorporation of CNTs.

In addition to nanostructures and microstructures, other types of additives may be added to the polymer solution or the dispersion medium for various purposes. Examples include, but are not limited to, colorants (e.g., fluorescent dyes and pigments), odorants, deodorants, plasticizers, impact modifiers, fillers, nucleating agents, lubricants, surfactants, wetting agents, flame retardants, ultraviolet light stabilizers, antioxidants, biocides, thickening agents, heat stabilizers, defoaming agents, blowing agents, emulsifiers, crosslinking agents, waxes, particulates, flow promoters, and other materials added to enhance processability or end-use properties of the polymeric components. Such additives can be used in conventional amounts. These additives can be added before, during or after formation of the polymer dispersion and/or formation of the polymer fibers. In certain embodiments, a surfactant, such as a nonionic or anionic surfactant, is added to a solution comprising the fibers in order to enhance dispersion of the fibers in the solution, particularly where the fibers are in an aqueous solution.

Nanofibers produced according to the present disclosure may be solid, hollow, or porous, where the pores may be opened or closed. Hollow fibers, for example, may be formed by shearing double emulsions with polymer-containing dispersed-phase components of various controlled sizes. When a double emulsion dispersed-phase component is stretched by the shear flow in accordance with the presently disclosed method, as only one of the phases interacts favorably with the dispersion medium, a core-shell fiber may be fabricated. If the immiscible core of the fiber is a liquid, it may be subsequently washed out to create a hollow tube.

If the polymer solution is introduced into the dispersion medium in the form of pre-formed dispersed-phase components, e.g., as an emulsion, the length of the fibers that could be obtained may be limited by the size of the dispersed-phase components. This variation of the method may allow one to produce polymer rods, potentially with good control over length and aspect ratio, from high molecular weight polymers that normally form only fibers.

Nanofibers produced according to the present disclosure have a wide variety of applications. As a few non-limiting examples, polystyrene fibers may be utilized to fabricate disposable nonwoven sheets, pads or foam products. Other examples include medical prostheses, textured surfaces and sensors (including implantable, ingestible and transdermal applications); biomedical textiles; scaffolds in tissue engineering; bioceramics; vehicles for delivery of biological or chemical materials; smart materials responsive to external stimuli (e.g., pH, light, heat, moisture), such as for customized heat response near the human body temperature, tuned pH/humidity response for protective clothing textiles, adjustable breathability, and combat-field materials for smart gas-mask filters with selective responses to virus, gas and other threats; electromagnetic shielding; acoustical insulation; photocatalysts; protective clothing (including antibacterial, photo-protective, etc.); wound dressings; and conductive and/or electronic textiles such as flexible organic and hybrid organic/inorganic microcircuit textiles, LED light color modifiers, and photovoltaics including solar cells. Nanofibers produced from various polymers may be utilized in the fabrication of filters and barriers for nano-scale and micro-scale applications, including purification of proteins and other biopolymers, and membranes for hydrogen production. Nanofibers may be processed according to the present disclosure from recycled polystyrene and subsequently utilized to fabricate fiber-based products of higher value than recycled products fabricated from conventional techniques. Nanofibers spun from DNA may be utilized to create templates for biomimetric or biological materials. Polypeptides, proteins and their derivatives may be utilized to fabricate biocompatible fibers, silks, and many other products. Other examples of applications include those noted above in the background section of this disclosure.

FIG. 1 is a schematic view of an example of an apparatus or system 100 that may be utilized for fabricating the nanofibers. The apparatus 100 generally includes a container 104 for containing a volume of dispersion medium and receiving polymer solution, a structure 108 extending out from the container 104, and a dispensing device 112 for supplying the polymer solution to the dispersion medium. The dispensing device 112 may be of any suitable type for introducing the polymer solution (optionally with additives) into the dispersion medium from a suitable supply source (not shown). The container 104 and the structure 108 may be configured such that they both provide surfaces cooperatively defining the boundaries of the volume of the dispersion medium, and such that the container 104 and/or the structure 108 move. That is, the container 104 serves as an outer boundary or surface and the structure 108 serves as an inner boundary or surface, at least one of which moves relative to the other to effect shearing. In the present example, the container 104 is a stationary outer cylinder and the structure 108 is an inner cylinder extending upward from the inside bottom of the outer cylinder in a concentric arrangement along its center axis. The outer cylinder and the inner cylinder cooperatively define an annular cylindrical interior containing the dispersion medium. The inner cylinder is driven by a suitable motor (not shown) to rotate at a desired angular velocity about the center axis, as indicated by an arrow. The polymer solution supplying device 112 may be any suitable conduit or applicator that dispenses the polymer solution from its tip by any operating principle (e.g., pumping action, capillary action, etc.). Rotation of the inner cylinder relative to the stationary outer cylinder imparts a shear stress to the components contained in the outer cylinder. By way of example, FIG. 1 illustrates polymer solution being dispensed into the outer cylinder 104 as droplets 116 and dispersed-phase components 120 of the polymer solution undergoing shear in the dispersion medium, which as described below causes polymer solvent to diffuse out from the dispersed-phase components 120 into the dispersion medium.

The apparatus 100 illustrated in FIG. 1 is advantageous in that it can generate uniform shear stress. Moreover, the shear stress may be highly tunable by changing one or more variables that control the shear stress proportionately, such as the viscosity of the dispersion medium (i.e., the shear medium), the shear rate (e.g., the revolution speed of the inner cylinder in the present example), and the gap between the outer cylinder and the inner cylinder. By controlling the shear stress, while keeping the shear stress uniform, one may control the final diameter of the uniform fibers produced by the apparatus 100. It will be understood that the present teachings are not limited, however, to the apparatus 100 illustrated by example in FIG. 1. Many other designs and types of apparatus may be suitable, but preferably are configured to enable the maintaining of uniform shear stress and control over the uniform shear stress as just described.

In the example illustrated in FIG. 1, the outer cylinder (container 104) has a radius of $r_o$ relative to its central axis, and the inner cylinder (structure 108) has a radius of $r_i$ relative to the same axis. The inner cylinder rotates at an angular velocity of $\omega_i$ and the outer cylinder is stationary ($\omega_o=0$). The dispersion medium is or approximates a Newtonian fluid such that its fluid velocity profile may be depicted as shown during rotation of the inner cylinder.

As an alternative, the apparatus 100 may be configured to rotate the outer cylinder 104 at an angular velocity of $\omega_o$ while the inner cylinder 108 remains stationary ($\omega_i=0$). In this case, the dispersion medium will have a different fluid velocity profile (not shown) in which the velocity vectors are largest near the rotating outer cylinder 104 and smallest near the stationary inner cylinder 108. Rotation of the outer cylinder 104 may be useful for operating at higher shear stress without the onset of turbulence. As indicated by an arrow in FIG. 1, in some implementations the apparatus 100 may be configured to reciprocate or oscillate the inner cylinder 108 along its axis, i.e., in an axial direction orthogonal to the radial gap between the outer cylinder 104 and the inner cylinder 108, which may further contribute to stabilizing the flow. In other implementations, the polymer solution may be delivered to the dispersion medium through openings 132 formed through the inner cylinder 108 or other types of orifices, tubes or injectors.

In still other implementations, an electrical field may be applied in a radial direction by applying a voltage potential between the outer cylinder 104 and the inner cylinder 108, as depicted schematically by a positive terminal 136 and a negative terminal 138. Alternatively, the apparatus 100 may be configured to apply an electrical field in an axial direction. Depending on the kinetics of the fiber formation, it is possible to permanently polarize electrostatically fibers containing polar side-group chains. Hence, fibers exhibiting anisotropic surface properties may be formed. It is also possible to displace the nanoparticles inside the polymer creating fibers with anisotropic bulk structure. Other types of fields that can be applied during the shear formation process to modify the properties of the nanofibers formed include magnetic fields, light fields or thermal gradients.

Figure 4:
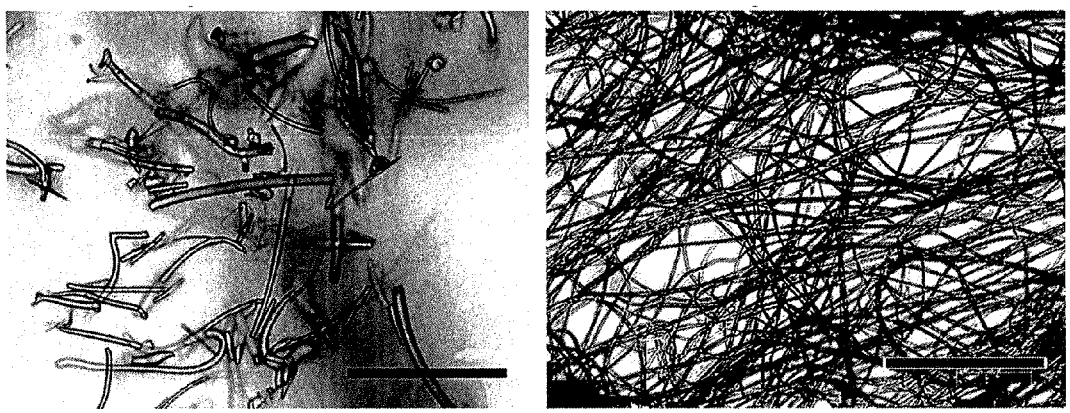
FIGS. 4A and 4B are a set of optical micrographs of structures obtained from polystyrene solutions sheared in a medium containing 75% glycerol:25% ethanol, sheared at 2000 rpm for 3 min, in which all scale bars=100 μm. Specifically.

FIGS. 2A to 2E illustrate the formation of either nanorods (FIG. 2D) or nanofibers (FIG. 2E) from dispersed-phase components of the polymer solution (FIG. 2A), schematically depicting the mechanism of rod or fiber formation by way of solvent attrition under shear in accordance with the present teachings. After a dispersed-phase component is introduced into the dispersion medium, it becomes deformed due to shear stress (FIG. 2A). The dispersed-phase component may break up into smaller components (FIG. 2B) until the shear forces are balanced by the interfacial tension forces. The dispersed-phase components then elongate and stiffen as the polymer solvent diffuses out into the dispersion medium, thereby forming proto-fibers (FIG. 2C). The anti-solvent of the dispersion medium may coat the proto-fibers and may diffuse into the proto-fibers. As described further below, it has been discovered that the molecular weight (MW) of the polymer plays a role in the rod/fiber formation process. Specifically, it has now been found as a general case that low-MW polymers result in the formation of polymer rods (FIG. 2D) whereas high-MW polymers result in the formation of polymer fibers (FIG. 2E). It is hypothesized herein that the higher MW of the fiber-forming polymers is associated with a high level of molecular entanglement of the polymer solution, whereas lower MW is associated with low entanglement levels leading to rod formation. Images of examples of such rods and fibers are illustrated in FIGS. 4A and 4B, respectively, and referred to below.

Without wishing to be bound by any particular theory, the following discussion of the mechanism of rod or fiber formation by way of solvent attrition under shear in accordance with the present teachings is provided. A droplet immiscible with a sheared Newtonian fluid medium is deformed under the influence of two forces—shear stress, which would deform it, and interfacial tension, which would minimize the droplet surface area and confine it to a sphere. The balance of those two forces can be quantified by the dimensionless capillary number Ca:

$$Ca = \frac{\tau a}{\gamma}, \text{ where } \tau \approx \frac{\mu \omega_i r_i}{d}. \tag{1}$$

Here, $\tau$ is the shear stress, a is the droplet radius, and $\gamma$ is the interfacial tension, $\mu$ is the fluid viscosity, $r_i$ and $\omega_i$ are the radius and angular velocity of the inner cylinder, respectively, and $d=r_o-r_i$ (FIG. 1). For low Ca, the surface tension dominates and the droplet remains close to spherical. For high Ca, the shear stress dominates and the droplet stretches into a long cylinder. At a critical value, $Ca_{cr}$, which is a function of the ratio $p=\mu_1/\mu_2$ of the viscosities of the droplet and the media, the cylinder breaks up into smaller drops due to Rayleigh and other instabilities, such as tip-streaming. For viscosity ratios $p>3$, $Ca_{cr}$ diverges, so it is almost impossible to break up the droplet. For $0.1<p<3$, $Ca_{cr}$ varies between 0.3 and 1. For $p<0.1$, $Ca_{cr}$ increases for break up due to drop fracture, but a second tip-streaming mechanism appears with a constant $Ca_{cr}=0.5$ for all $p<0.1$. See Mabille et al., *Europhys. Lett.*, 2003, 61, 708; Sugiura et al., *J. Phys. Chem. B*, 2002, 106, 9405; Rallison, *Annu. Rev. Fluid Mech.*, 1984, 16, 45; Li, *Phys. Fluids*, 2000, 12, 269; and Grace, *Chem. Eng. Commun.*, 1982, 14, 225. Alternatively, the tip-streaming may be conducive to the formation of initial fibers, which then get drawn out of the parent droplets by the shear forces. Whatever the process of polymer fiber formation is, the polymer droplets (or other type of dispersed-phase components) deform and break up in the shear flow until they reach a critical size, which is likely determined by the capillary number Ca as well as the competition between the shear extension and diffusion. At the critical size, the polymer solvent leaves the droplets, and the droplets thereby become solidified in the deformed state. Further explanation and description of the mechanism of fiber formation according to the present teachings is provided below in conjunction with experimental Examples.

Aspects of the fiber formation process taught herein—e.g., the use of an anti-solvent medium miscible with the polymer solvent, the use of a solution including a polymer having an appropriate molecular weight, the generation of moderate to high shear stresses, etc.—are readily amenable to scale-up for industrial and commercial applications. Accordingly, no limitation is placed on the dimensions of the apparatus utilized to carry out the process. In the case of an apparatus based on a cylindrical drum inside a cylindrical enclosure with one or both of these components rotating, such as illustrated by example in FIG. 1, the diameters and lengths of the cylinders may, for example, be on the order of meters. A large-scale apparatus may be capable of producing a large amount of fibers of significant length. Means may be provided to assist in removing fibers from the apparatus. For example, long fibers may become wrapped about a rotating inner cylinder. The inner cylinder may be provided with small, retractable drums or other structures (not shown) that cut or remove as-produced fibers upon activation by a user.

Figure 3:
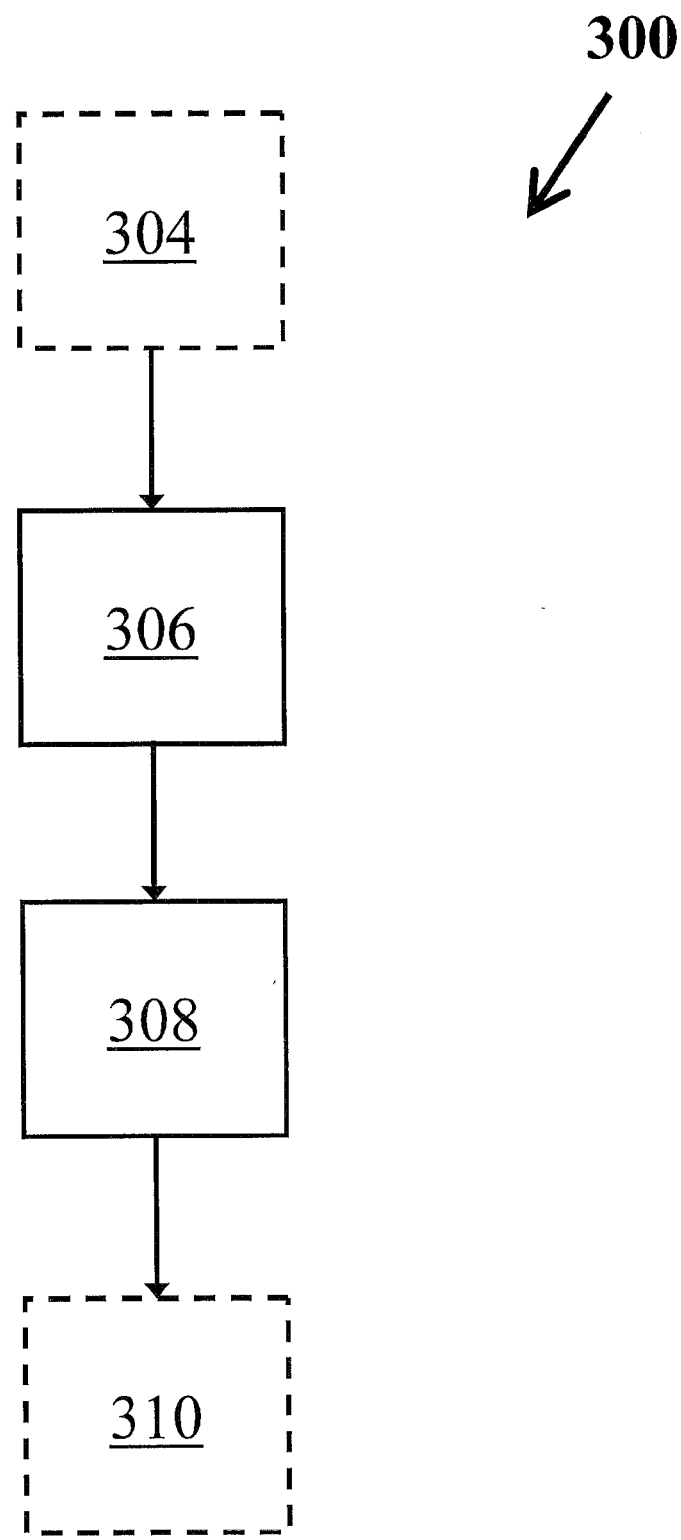
FIG. 3 is a flow diagram illustrating an example of a method for fabricating polymer nanofibers in accordance with the present disclosure.

FIG. 3 is a flow diagram illustrating an example of a method 300 for forming polymer nanofibers. Optionally, at block 304, any desired or necessary pre-formation steps may be taken. Such pre-formation steps may include preparing the polymer solution, adding nanoparticles or other additives as desired. At block 306, the polymer solution is introduced into a dispersion medium. At block 308, shear is imparted to the dispersion medium to form polymer fibers from the polymer solution. Optionally, at block 310, any desired or necessary post-formation steps may be taken. Such post-formation steps may include removing the fibers from an apparatus in which the fibers were formed, washing and drying the fibers, wet-laying the fibers, incorporating the fibers into a product, etc. The flow diagram illustrated in FIG. 3 may also schematically represent an apparatus or system 300 configured for carrying out the process steps just described. Additional apparatus features used for fiber alignment, extension, extraction and other processing may be included as needed.

In an alternative implementation, a method for fabricating polymer strands or strings is provided. The polymer of the polymer strands may have a molecular weight of less than about 20,000 Da. Similar to the methods described above, the polymer strands may be formed by introducing a polymer solution into a dispersion medium and shearing the polymer solution. In this case, the resulting polymer strands having an aspect ratio of about 100 or less. Unlike previously fabricated polymer rods (U.S. Pat. No. 7,323,540, commonly assigned to the assignee of the present disclosure, the content of which is incorporated by reference herein in its entirety), the polymer strands are not necessarily straight or rigid. The strands may be utilized in a wide variety of applications and articles of manufacture for which relatively short, non-rigid polymer fibers are desirable.

Examples

Fabrication of Polymer Nanofibers

For the following experiments, high molecular weight (MW) polystyrene (PS) was obtained from Aldrich (430102, $M_w \approx 190,000$-$230,000$, $M_w/M_n \approx 1.6$). Low MW PS was obtained from Pressure Chemical (Pittsburgh, Pa.), with $M_w = 5,780$, $M_w/M_n = 1.05$. Cellulose acetate from Aldrich was used (180955, average $M_n$ ~30,000 by GPC). Poly (L-lactic acid) from MP Biomedicals (151931, $M_w$ ~700,000), chloroform ($CHCl_3$) (Acros 61003-0040), and denatured alcohol (Fisher A995-4), containing 90% ethanol and ~5% each of methanol and isopropanol, were obtained through Fisher Scientific. Nanoparticles of oleic acid capped iron oxide nanocrystals (10 nm) were obtained from Ocean NanoTech (Fayetteville, Ak.). These nanoparticles were easily suspended in $CHCl_3$.

A lab scale Couette flow apparatus, similar to the apparatus 100 illustrated in FIG. 1, was constructed by combining a mixer with a straight cylindrical shaft and a centrifuge tube. The mixer was a Cole-Parmer Servodyne Model #50003 with digitally controllable speeds (150-6000 rpm). Polypropylene centrifuge tubes (17×100 mm, ID=14.6 mm, Evergreen Scientific), obtained through Fisher Scientific, acted as the stationary outer cylinder wall in the device. The radii for the shaft, $r_i$, and the stationary tube, $r_o$, were 5.00 mm and 7.32 mm respectively. Clamping a disposable tube to a bench stand and centering it around the bare rotating shaft resulted in an easy-to-clean setup where only the shaft had to be wiped clean after each experiment.

In these experiments, 0.2 ml of polymer solution was quickly injected in the 2.3 mm gap between the rotating shaft and the stationary tube, which contained about 6.6 ml of shearing fluid. The most common shearing medium was 75% glycerol:25% ethanol (v/v), with dynamic viscosity $\mu=0.15$ Pa s and density $\rho=1140$ kg m$^{-3}$. Various rotor speeds were used to shear the solution, usually 2000 rpm ($\omega_i=209$ rad s$^{-1}$, $\omega_o=0$, FIG. 1), for 2-5 min. Polymer solution droplets were introduced into the flow where they were broken up and deformed until the polymer solvent diffused out into the antisolvent medium. The resulting fibers were subsequently removed from the shearing medium and the shaft, washed with the antisolvent (usually ethanol) and dried before imaging in either optical or scanning electron microscopy (SEM).

SEM images were obtained on a Hitachi S-3200N SEM after applying 6-12 nm of Au/Pd sputter coat to minimize charging and improve resolution. Beam energies of 5 kV, with low beam current and short working distance were used to increase resolution. TEM images were obtained on a JEOL 2000FX HRTEM at Atomic Resolution Electron Microscopy Center (AREMC).

Fiber diameter distributions were measured by analyzing SEM images containing 20-30 fibers each and with a minimum resolution of 800×800 pixels. Fiber diameters were measured in pixels, scaling by the image-embedded scale bar, and building a distribution histogram. At least 50 measurements were made to characterize the fibers for each processing condition.

Figure 2:
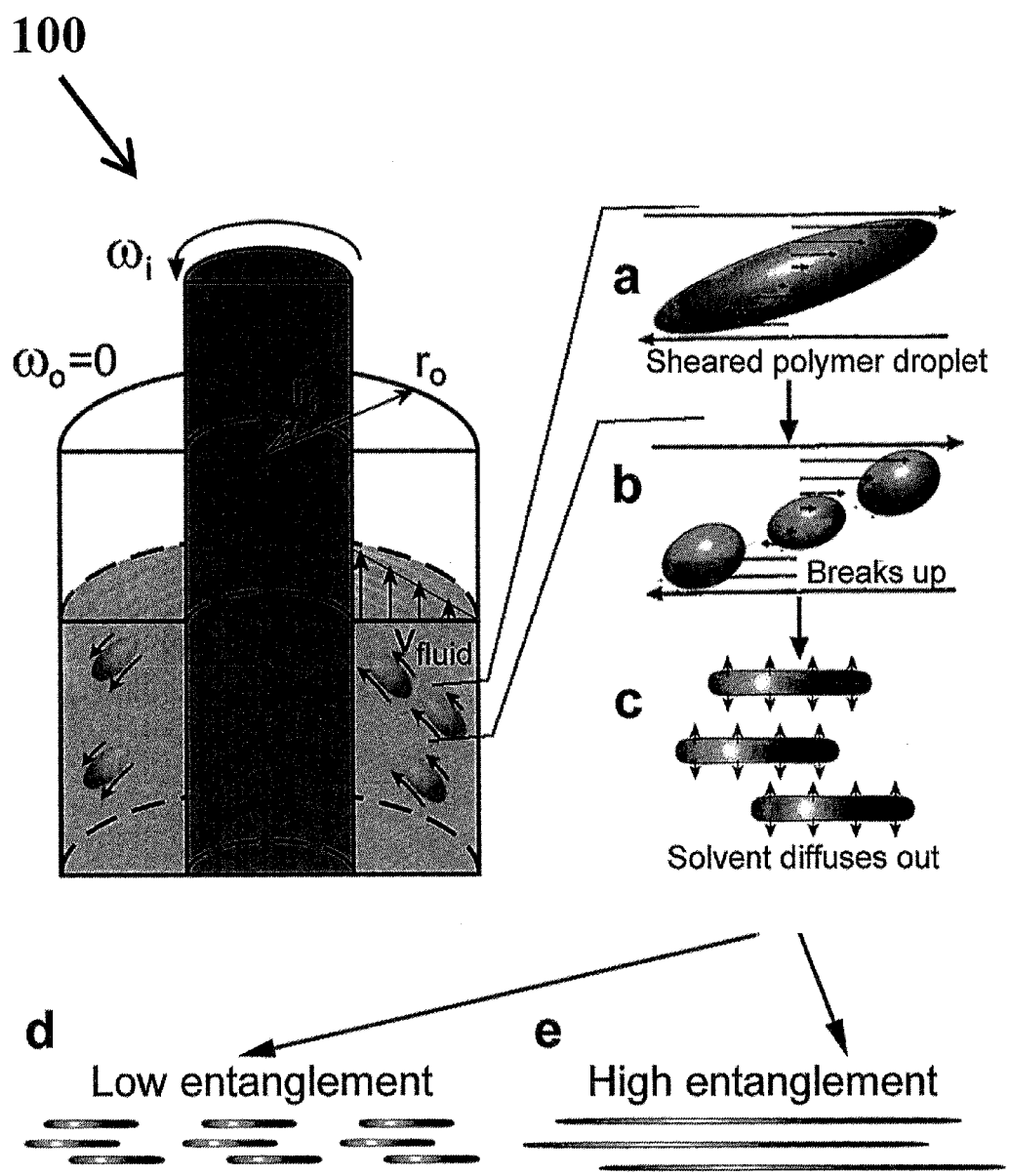
FIGS. 2A to 2E illustrate the formation of either nanorods (FIG. 2D) or nanofibers (FIG. 2E) from fiber precursor solution sheared in the device in accordance with the present teachings.

The main parameters for the current process were as described earlier in this disclosure: a) use of a viscous medium that provides high shear stress $\tau=\mu G$ for a given shear rate G, b) a polymer solvent which is miscible with the shearing medium, and c) the medium is/contains an antisolvent for the polymer. As illustrated in FIG. 2, nanofibers are produced in two steps. First, the dispersed-phase components of the polymer solution deform and break up in the shear flow until they reach a critical size, determined by the capillary number as well as competition between the shear extension and diffusion. Second, at the critical size, the polymer solvent leaves the dispersed-phase components, solidifying them in the deformed state. The lab-scale Couette flow device used in this experiment provided uniform shear stress throughout its entire volume and a simpler geometry for modeling the process. As described below, experiments with several common polymers resulted in the fabrication of fibers instead of rods, unlike the SU-8 polymer microrods fabricated from SU-8 solutions sheared in glycerol/ethanol mixtures previously. See U.S. Pat. No. 7,323,540, referenced above; Alargova et al., *Adv. Mater.*, 2004, 16, 1653; and Alargova et al., *Langmuir*, 2006, 22, 765.

Disregarding polymer-solvent interactions for a moment, it is hypothesized that the origin of this difference is due to the higher molecular weight of the fiber-forming polymers $M_n$ ~30,000-700,000 vs. the low molecular weight of SU-8, $M_n$ ~7000±1000. A high level of entanglement of the polymer solution may be necessary for producing the fibers (FIG. 2E), while low entanglement levels would lead to polymer rod formation (FIG. 2D). This finding may facilitate formulating the necessary conditions for solution nanospinning of fibers or rods from a wide variety of polymers.

Polystyrene (PS) solutions in chloroform were chosen to test the hypothesis, because PS could be obtained with vastly different molecular weights, while keeping the same polymer-solvent interactions in the system. Indeed, by performing the experiment with two batches of polystyrene of molecular weight (MW)=5.8 k and 230 k respectively, under nearly identical conditions, short rods (FIG. 4A) were obtained for the low molecular weight polymer, and long fibers (FIG. 4B) were obtained for the high molecular weight polymer.

Several process variables that might affect the diameters of the resulting fibers were identified. High MW PS solutions were used in these tests and shed light on the mechanism of fiber formation. First, the effect of the initial polymer solution concentration (FIG. 5A) was studied. The fibers formed at concentrations of 10-20% w/w PS in chloroform had similar diameters, within the error of the measurements. Interestingly, lower initial concentrations (4% w/w PS) did not result in fiber formation. This is likely caused by a tip-streaming breakup mode for the low viscosity droplets (at $p_{crit} \leq 0.1$). Tip streaming is also a probable reason why dilute SU-8 polymer solutions produced no rods for values of p close to or <0.1.

See Alargova et al., *Langmuir*, 2006, 22, 765. At high concentrations (30% w/w PS) only irregular PS chunks were recovered, likely because the high viscosity of the droplets prevented their stretching before they could solidify.

It should be noted that for droplets containing solvent miscible with the medium, as in the present experiment, the hydrodynamic analysis in the experimental section only describes the behavior of droplets >5-10 μm. During the flow timescale ($G^{-1}$, ≈2 ms for ω=2000 rpm), which governs droplet deformation, the diffusion length in the 75% glycerol:25% ethanol medium is only a fraction of a micron, so the droplets and shearing medium can be approximated as immiscible phases. When the droplet is stretched into a thin cylinder with micron dimensions, however (FIG. 2C), the diffusion effects become significant. The solvent leaving the droplet increases the polymer concentration inside the cylinder, and in addition antisolvent from the medium forms a sheath of hardened, coagulated polymer at the cylinder surface.

Figure 5:
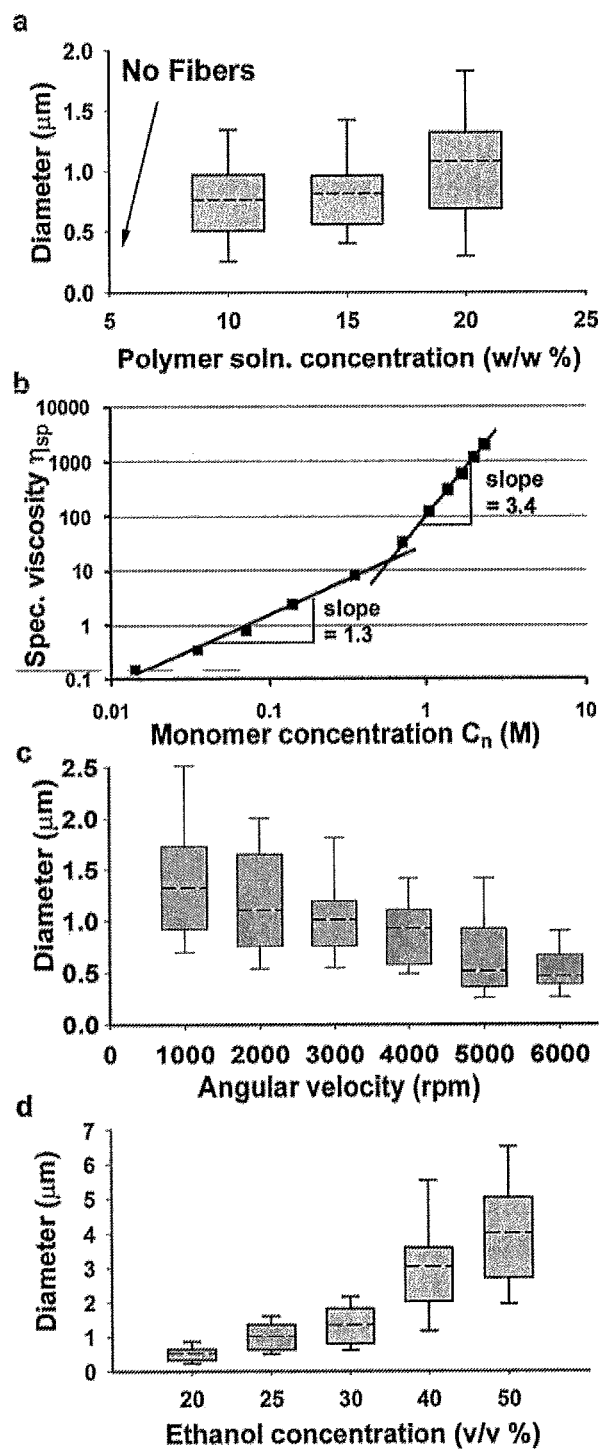
FIGS. 5A to 5D are a set of data demonstrating the dependence of fiber diameters on values of processing parameters. Specifically, FIG. 5A plots fiber diameter (μm) as a function of polymer solution concentration (w/w %), demonstrating the effect of polymer solution concentration in a device such as illustrated in FIG. 1.

Second, the effect of shear stress was characterized, since it determines the value of the capillary number Ca and the smallest sizes of deformable drops (Eqn. 1). At low rotation angular velocities (≤500 rpm), the polymer did not completely separate into fibers, coagulating into large, bulky strands and networks. At higher shear rates, the formation of neat fibers with a monotonic decrease both in the average diameter and diameter distribution was observed when increasing angular velocities from $\omega_i$=1000 to 6000 rpm (increasing τ from ≈34 to 204 Pa) (FIG. 5C). While a decrease in fiber diameter was observed up to the top speed of which the equipment utilized was capable (6000 rpm), further increases in shear rate would likely result in even lower average fiber diameters.

In the third experimental cycle, the amount of ethanol (antisolvent) in the shearing medium was changed (FIG. 5D). Though this change directly affects the polymer-antisolvent medium interactions, predictions from hydrodynamic dimensional analysis may be helpful for understanding the results. The maximum value of the medium viscosity $\mu_2$ for which fibers are formed is limited by the breakup instability for all $p=\mu_1/\mu_2<p_{crit}\approx0.1$ (need $\mu_2<10\mu_1$). For 0.1<p<2, the critical capillary number $Ca_{cr}$ is near its minimum $Ca_{cr}\approx0.4$ and almost constant. For this range of p a lower $\mu_2$, e.g., from more EtOH in the medium, also results in a lower shear stress $\tau=\mu_2 G$, and therefore a larger radius a of the stretched polymer solution cylinders that form the fibers (Eqn. 1). Therefore, one expects the average fiber diameter to be a decreasing function of viscosity, achieving a minimum value for value for $\mu_2$ just below $10\mu_1$, beyond which no fibers would be formed.

Indeed, for ethanol concentrations [EtOH]≤20% v/v, no fibers were formed. [EtOH]=25% v/v produced the smallest average diameter fibers. For 25%<[EtOH]<63% v/v, the average fiber diameter increased rapidly with increasing [EtOH], as did the polydispersity of the fibers. In addition to lowering the medium viscosity, high [EtOH] also increased the antisolvent propensity of the medium and its diffusion coefficient, which could also be a reason for the observed increase in fiber diameters. Faster antisolvent diffusion competing with hydrodynamic deformation, which stretches droplets into smaller and smaller diameter cylinders, would result in larger diameter fibers due to earlier fiber solidification.

The Couette flow utilized in the production of the fibers of this Example is known to become unstable above certain angular velocities, as originally discussed in detail by Taylor. See Taylor, *Phil. Trans. R. Soc. Lond. A-Math. Phys. Sci.,* 1923, 223, 289. The angular velocity at which the flow becomes unstable, is given by the Taylor number Ta:

$$Ta = \frac{r_i(r_o - r_i)^3(\omega_i^2 - \omega_o^2)}{v_2^2}, \tag{2}$$

where $v_2=\mu_2/\rho_2$ is the kinematic viscosity, $\mu_2$ and $\rho_2$ are the dynamic viscosity and the density of the shearing medium, and $r_{i,o}$, $\omega_{i,o}$ are as labeled in FIG. 1. The critical Taylor number for onset of turbulence under ideal conditions is $Ta_c\approx1700$. See Chandrasekhar, *Proc. Royal Soc. London Ser. A—Math. Phys. Sci.,* 1962, 265, 188; and Snyder, *Proc. Royal Soc. London Ser. A—Math. Phys. Sci.,* 1962, 265, 198.

The turbulence observed at high $\omega_i$ contributes to non-uniformity in the fiber diameters due to instability of the open interface between the shearing medium and the air, though minute misalignments of the rotor leading to non-uniform gap spacing might contribute as well.

Placing baffles, to eliminate the open air interface and its destabilizing end effect, has shown a monotonic decrease of fiber diameter with shear rate up to the maximum 6000 rpm achievable in one particular experimental setup (FIG. 5A). In some implementations, one or more baffles may be positioned perpendicular to the cylinders 104, 108 shown in FIG. 1, with each baffle having a central opening just large enough for the inner cylinder 104 to pass through. As an example, FIG. 1 illustrates an annular baffle 140. When such a device is filled with a liquid to a level just above the baffle 140, the air is not pulled in and the flow is more stable. One could also make use of additional strategies that have been reported for stabilizing flow. Most involve modulating the speed of the rotor, introducing liquid flow in the axial direction, or periodic movement of the central cylinder in the axial direction. Another strategy follows from the inverse square dependence of Ta on medium viscosity $\mu_2$ (Eqn. 2). A more viscous shearing fluid would stabilize the flow by lowering Ta.

The diameters of fibers of the present Example are at least an order of magnitude smaller than those of most wet-spun fibers, and determining the mechanism of their formation may enable the process to be optimized. A small number of tiny polymer fibrils (~200 nm, with occasional ones ~100 nm) was observed under most conditions, including varying antisolvent concentration in the medium. This result points towards a phase-separation mechanism governing the final fiber formation. The exact instability mechanisms leading to the formation of very thin fibers are still not understood completely. However, a judicious combination of parameters clearly leads to formation of submicron fibers.

Figure 6:
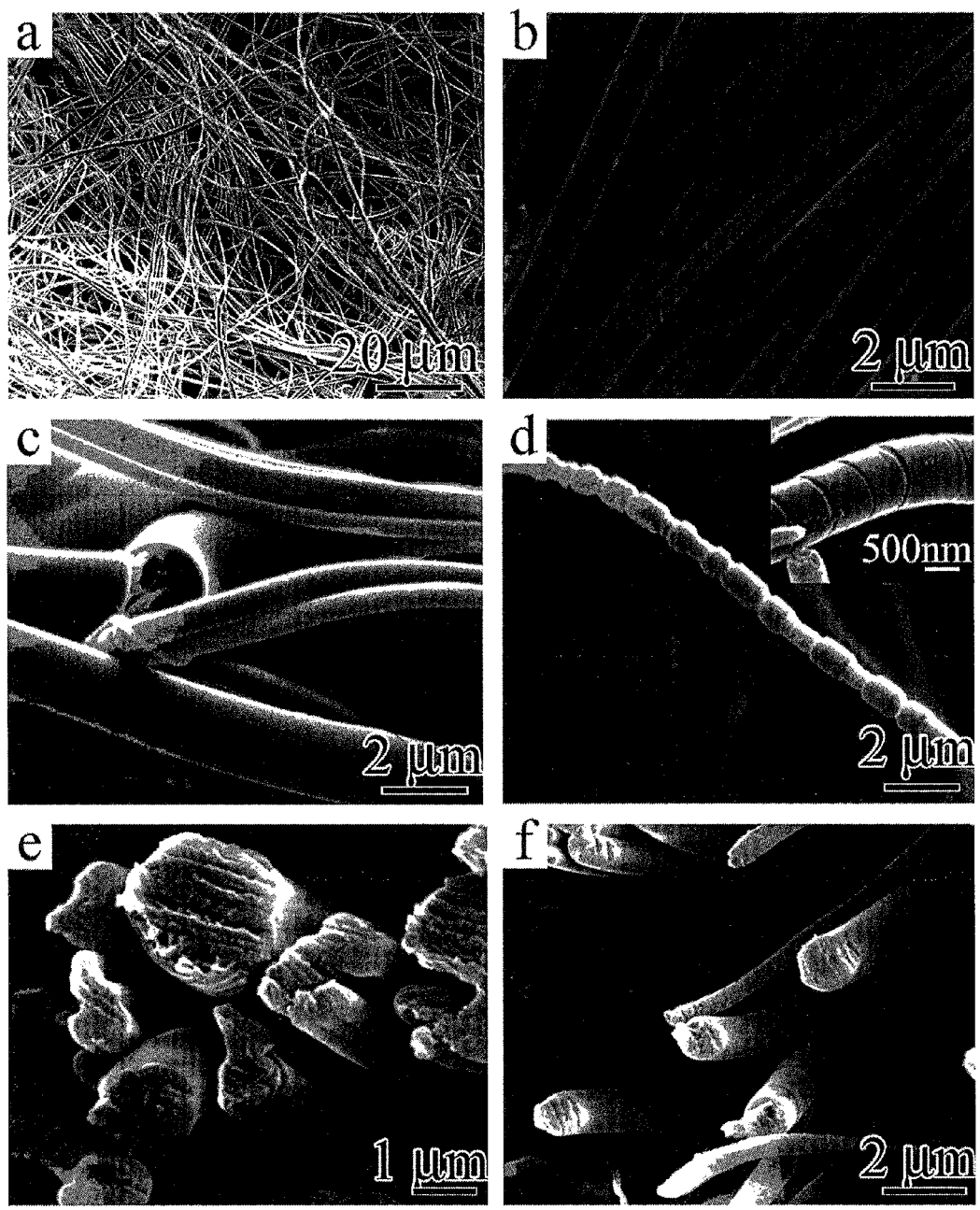
FIGS. 6A to 6F are a set of scanning electron microscopy (SEM) micrographs of PS fibers formed from 15% solution (w/w in $CHCl_3$) sheared into 75% glycerol:25% ethanol at 2000 rpm. Specifically.

FIG. 6 is a set of scanning electron microscopy (SEM) micrographs of PS fibers formed from 15% solution (w/w in $CHCl_3$) sheared into 75% glycerol:25% ethanol at 2000 rpm. FIGS. 6A and 6B show typical fibers produced in the present Example. The diameters ranged from ~200 nm to ~2 μm and the average size was ~500 nm. FIG. 6C shows a rare broken fiber with a void space in its interior. Cross-sectional SEM and TEM imaging showed that the fiber interiors were solid polymer. Referring to FIG. 6D, approximately 5% of the fibers have an uneven surface, which upon closer examination was considered to be due to a series of closely-spaced necking deformations with constant diameter sections in between. FIGS. 6E and 6F are SEM images of cross-sections of the fibers of the present Example, obtained after fracturing fiber bundles in liquid nitrogen. Larger fibers with diameters >~1 μm have a few small pores (FIG. 6E), but no such pores are observed in smaller fibers (FIG. 6F).

Figure 7:
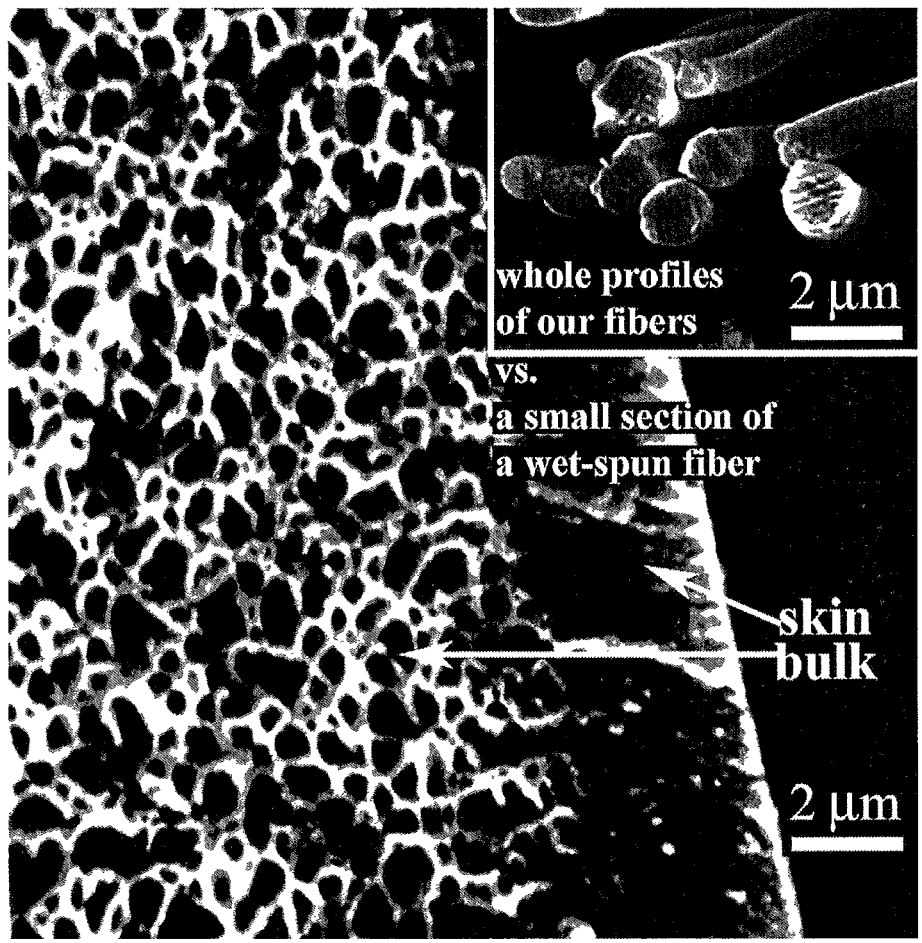
FIG. 7 is a SEM micrograph showing a same-scale comparison of a partial cross-section of a typical wet-spun fiber and cross-sections of nanospun PS fibers (inset) formed by the present teaching. The outer skin of the wet-spun fiber (2-3 μm) has a different morphology from the macropore-filled bulk of the fiber. The skin is produced by quick precipitation of the polymer when it comes in contact with the polymer solution. The macropores inside the fiber result from the slower diffusion of solvent through this skin barrier and subsequent phase-separation processes. The fibers formed by the present teaching have diameters much smaller than the skin layer, so it is likely that they are produced by precipitation mechanisms.

FIG. 7 contains SEM cross-sectional view micrographs of part of a wet-spun fiber and several nanospun fibers. The morphology of the nanospun fibers provides information on the mechanism of their formation. The fibers show no voids inside, suggesting that they are formed by a vitrification process upon direct contact between the coagulant and polymer solution. Similar processes have been observed in the formation of a non-porous glassy skin layer on the surface of electrospun fibers, or the skin layer in wet-spun fibers. Glassy layers are formed on a fast timescale, compared to phase-separation. The round profile of the fibers also indicates that the solidification process is faster than the buckling timescale, otherwise one would expect fibers with wrinkled surface topographies. The above observations are consistent with nanospun fibers which, due to their small diameter and fast solvent-antisolvent interdiffusion, are composed mostly of a glassy skin layer, preventing void formation inside. The Figures also highlight the difference in size between nanospun and wet-spun fibers—shown here on the same scale. Due to the large size of wet-spun fibers, only the outer "skin" layer formation is fast, compared to phase-separation. By contrast, the morphology inside wet-spun fibers is characterized by macrovoids, formed via phase separation during the slower interdiffusion of solvent and antisolvent through this skin layer, via either nucleation and growth or spinodal decomposition processes.

Another feature, observed on about 5% of the fibers formed, is the presence of multiple necking deformations (FIG. 6D). Some fibers were heavily decorated almost along their entire length, while the rest of the fibers were uniform and smooth. One hypothesis is that a fraction of the fibers experienced higher than usual shear stresses and their stiffer skin broke in places, revealing the longer-stretching inner core. Such multiple necking has been observed previously in electrospun nanofibers and attributed to a stretching deformation. It was noted in that case that larger fibers only fail with one or two necking deformations. The alternative reason given for the multiple necking of nanofibers is a perturbation wavelength on the order of 50× the fiber diameter, and that multiple wavelengths fit over the fiber length observed. In the present experiment, however, the distance between necking deformations is similar to the diameter of the fiber, which is inconsistent with that hypothesis. The smooth cylindrical surface and constant diameter of the sections between necks (FIG. 6D) also supports the skin-core explanation.

Small angle X-ray scattering (SAXS) experiments may be utilized to verify the presence of the skin-core morphology, accurately measure the fiber skin thickness, and possibly determine its crystallinity. Additional experiments may be carried out to decouple the separate roles which shear stress and phase separation play in this complex nanofiber formation process. In wet-spinning, interactions with the solvent can cause polymer crystallization. The $\delta$-crystal form of syndiotactic polystryrene (sPS), for example, not only contains solvent molecules but its crystallization is often induced by the solvent molecules. On the other hand, in the absence of polymer-solvent interactions in polypropylene melts, shear has been shown to cause polymer orientation in a skin layer and also induce crystallization. The diameters of the fibers of the present Example are similar or smaller than the skin thickness of typical wet-spun fibers (FIG. 7), implying a similar potential role of phase-separation in both structures. X-ray structural comparisons may yield information on the role of shear stress.

Figure 8:
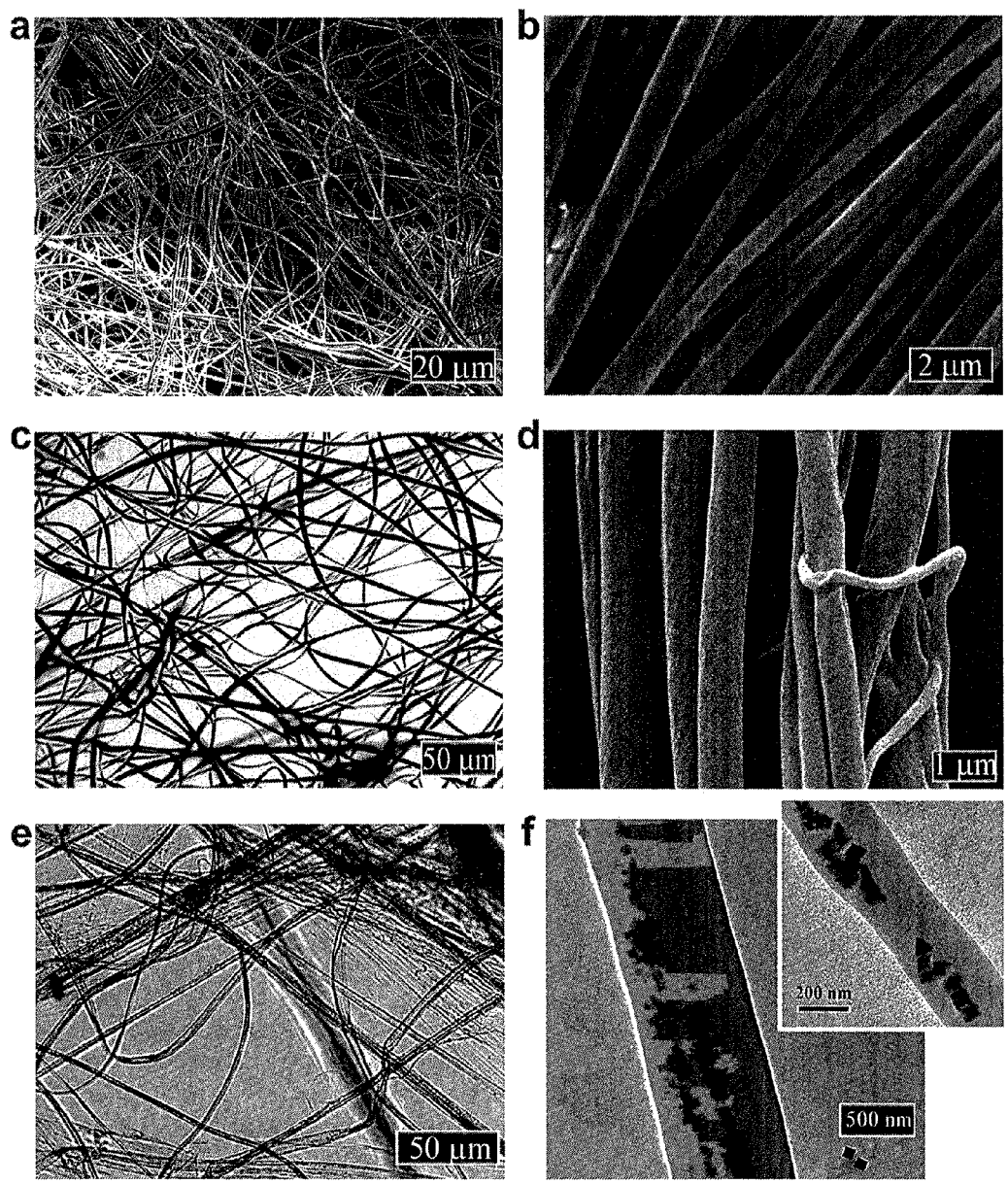
FIGS. 8A to 8F are a set of optical micrographs illustrating the following.

FIG. 8A is an SEM micrograph of PS fibers formed from 15% solution (w/w in $CHCl_3$) sheared into 75% glycerol:25% ethanol at 2000 rpm, and FIG. 8B is a high resolution SEM of the fibers in FIG. 8A. The method presented here, however, can be used in many systems, as the formation of fibers is not limited to polystyrene alone. To demonstrate the versatility of the method, other fibers were formed from two widely used, industrially important materials: cellulose acetate (FIGS. 8C and 8D), commonly used in filter manufacturing, and polylactic acid (PLA) (FIG. 8E), a renewable, biodegradable and biocompatible material used in tissue engineering and drug delivery. SEM images (FIGS. 8C and 8D) of the cellulose acetate fibers show that their diameters varied between 800 nm-2 μm with occasionally smaller and larger fibers. The method also has specific strengths in making fibers with embedded nanoparticles. The formation of polymer fibers containing solid nanoparticles by any process with nozzles is problematic as the particles often cause clogging due to aggregation. The nozzle-less shear nanospinning technique disclosed herein avoids this problem. The fabrication of magnetic composite fibers (FIG. 8F) was demonstrated by dispersing 50 nm magnetite ($Fe_3O_4$) nanocubes in a solution of polystyrene in $CHCl_3$, and shearing the mixed suspension/solution in a glycerol/ethanol medium. Specifically, the fibers were produced by shearing a PS solution (10% w/w in $CHCl_3$, containing ~0.5% w/w $Fe_3O_4$ nanocubes) into a 75% glycerol:25% ethanol medium at 2000 rpm for 3 min. Other experiments demonstrated the fabrication of magnetic composite fibers by dispersing 10 nm ferric oxide ($Fe_2O_3$) nanoparticles (not shown) in a PS solution under similar conditions, specifically by shearing a PS solution (10% w/w in $CHCl_3$, containing ~0.5% w/w $Fe_2O_3$ nanoparticles) into a 75% glycerol:25% ethanol medium at 2000 rpm for 3 min. Incorporation of various nanoparticles would make it possible to endow fibers made of a single polymer with a wide variety of functionalities, e.g., fluorescent detection fibers with embedded quantum dots, antibacterial filters and textiles with silver particles, and tissue engineering scaffolds with controlled drug-release particles. As other examples, catalyst immobilization, for chemical transformations and waste treatment among others, is one possible use because nonwoven composites would have active areas similar to those of nanoparticle suspensions. Embedding of $TiO_2$ particles can confer self-cleaning properties to fibers in the presence of UV light.

The fabrication capacity of this shear nanospinning method scales with the volume of the shearing device. The 6-ml benchtop setup employed in the above Example was able to produce nanofibers at a rate of ~0.1 g/min, and its volume production could be straightforwardly scaled up several thousand times by, for example, using available centrifuge equipment. Production rates of over 1.0 g/min have been achieved by using a scaled benchtop apparatus that included a larger diameter rotor (similar to the component 108 of FIG. 1) and a cylindrical beaker (similar to the component 104 of FIG. 1).

The method described herein can process a variety of polymers, and its scalability is one of its best advantages in nanofiber production. The method allows for the spinning of nanofibers from solution at room temperature which is highly desired in the processing of functional polymers, including conductive polymers for flexible electronics. Volume production of such fibers may provide concurrently economical electrical functionality and structural support, and would allow embedding in clothes and other textiles, including disposable garments. Mild processing conditions would benefit numerous other applications, including generation of biocomposite fibers containing active enzymes or even whole live cells.

To summarize the above-described Examples, a scalable method for nanofiber formation from solution based on shear flow has been presented. The fibers had diameters of 200 nm-2 μm, similar to electrospun fibers, and can be created from a wide variety of polymers. It was shown that polymer chain entanglement in solution may be necessary for the production of the fibers, while the smallest diameter size is possibly limited by fundamental phase-separation processes. Scaling up the process would lead to economic routes to polymer nanofibers and polymer-particle composites.

Composite Inorganic/Polymer Nanofibers and Inorganic Fibrils

According to other implementations, composite inorganic/polymer nanofibers are provided. The composite nanofiber includes a polymer nanofiber and a plurality of inorganic fibrils disposed in the polymer nanofiber. In the present context, "disposed in" generally means that the inorganic fibrils are confined or retained in the polymer medium. No limitation is placed on the specific mechanism of this confinement or retention. In some cases, chemical binding may be involved. Methods disclosed herein for fabricating composite inorganic/polymer nanofibers are similar to the above-described methods for fabricating polymer nanofibers, insofar as they entail utilizing shear stresses in a liquid-liquid dispersion system to form and stretch the nanofibers as generally illustrated in FIGS. 2 and 3. Moreover, a similar apparatus such as that illustrated in FIG. 1 may be utilized. The method differs in that it entails the addition of an inorganic precursor, the conversion of the inorganic precursor to an inorganic compound via reaction with an appropriate reagent and/or exposure to energy, and the formation of inorganic fibrils distinct from the nanofibers via phase separation of the inorganic fibrils from the nanofibers. In the context of the present disclosure, the term "inorganic fibrils" encompasses fibrils composed of the inorganic precursor and fibrils composed partially or entirely of the resulting inorganic compound. The exact composition of the inorganic fibrils depends on the experimental conditions that allow the conversion of the inorganic precursor into an inorganic compound and the relative timescales of phase separation and formation of the inorganic fibrils. The time of conversion may differ in different implementations.

In this method, a mixture with a particular ratio of the polymer solution and the inorganic precursor is employed in the place of the polymer solution described above. The ratio of polymer solution to inorganic precursor will generally depend on the type of polymer and inorganic precursor employed. In some implementations, the ratio of polymer solution to inorganic precursor ranges from 1:10,000 to 10,000:1 by weight. In other implementations, the ratio may range from 1:200 to 200:1 by weight. In other implementations, the ratio may range from 200:1 to 2:1 by weight. The polymer solution/inorganic precursor mixture may optionally include one or more additives as described above. The mixture is introduced into a dispersion medium by any means such as described above. Generally, as noted previously the dispersion medium should be viscous, include an antisolvent for the polymer employed, and be miscible with the solvent of the polymer solution. The mixture resides in the dispersion medium as dispersed-phase components (described above). The mixture may already be in the form of dispersed-phase components when added to the dispersion medium, or may be introduced as a continuous stream and thereafter break up into dispersed-phase components. As the polymer solution is introduced, it is sheared by any means such as described above. The shearing action deforms the dispersed-phase components of the mixture into liquid filament streams due to capillary instabilities. Upon further shear-induced filament elongation, the polymer solvent (being miscible with the dispersion medium as noted previously), diffuses out from the dispersed-phase components/filaments and into the dispersion medium. This causes an increase in the polymer concentration and phase separation between the polymer and the inorganic precursor. This process results in the formation of insoluble composite inorganic/polymer nanofibers that include inorganic fibrils dispersed in the polymer fraction of the nanofibers. The composite inorganic/polymer nanofibers may then be washed (utilizing, for example, a low-viscosity antisolvent), collected, and dried as desired.

In some implementations, the composite inorganic/polymer nanofibers may then be subjected to any suitable calcination or organics removal process to release (or liberate) the inorganic fibrils from the nanofibers. In this manner, the inorganic fibrils may be provided as an end product. Calcination may be performed in any device (furnace, kiln, fluidized bed reactor, etc.) configured for implementing calcination. The temperature at which calcination is carried out and the total time of calcination will depend on the type of polymer and inorganic compound utilized, and generally should be sufficient to vaporize the polymer fraction without thermally decomposing the inorganic fibrils. In some examples, the calcination temperature is about 200° C. or greater. In other examples, the calcination temperature is about 500° C. or greater. In other examples, the calcination temperature ranges from about 200 to about 1200° C. In some implementations, the calcination temperature may be varied according to a predetermined temperature program. In other implementations, the organic components may be removed by chemical treatment instead of thermal oxidation, dissolution, enzymatic degradation, etc.

As described above, the shear stress imparted to the dispersed-phase components may be controlled and kept uniform as desired. One or more operating parameters may be adjusted or tuned so as to control the shear stress, such as the viscosity of the dispersion medium, shear rate (e.g., revolution speed in the case of the device illustrated in FIG. 1), the gap between the inside cylinder and outside cylinder in the case of the device illustrated in FIG. 1, etc. Shear stress may be controlled, for example, to minimize the polydispersity of the final diameter of the composite inorganic/polymer nanofibers.

The polymer(s) utilized in the presently described method may have any naturally-occurring or synthetic composition described earlier in this disclosure. In typical implementations, the polymer has a molecular weight greater than 20,000 to ensure formation of high aspect-ratio nanofibers. Moreover, in the presently described method the polymer solvent(s), polymer solution concentration, antisolvents, antisolvent concentration in the dispersion medium, viscosity of dispersion medium, magnitude of applied shear stress, and insolubility of the polymer in the dispersion medium may all be specified as described earlier in this disclosure. Any of the particles (microparticles or nanoparticles) and/or other additives described earlier in this disclosure may be utilized as well.

The inorganic precursor that forms a mixture with the polymer solution will depend on the desired composition of the inorganic fibrils. The present method enables the formation of fibrils composed of a wide variety of inorganic compounds. Accordingly, a large number of inorganic precursors (i.e., precursors for the respective inorganic compounds) may be utilized so long as they are compatible with forming fibril-inclusive nanofibers in accordance with the methods disclosed herein. Examples of suitable inorganic compounds include, but are not limited to, ceramics such as titania, alumina and zirconia, and non-crystalline ceramic-like compounds such as silica, glasses, bioceramics, and bioactive glasses. Accordingly, examples of inorganic precursors include, but are not limited to, titania precursors, alumina precursors, zirconia precursors, silica precursors, bioceramic precursors, and bioactive glass precursors. Examples of titania precursors include titanium alkoxides (e.g., Ti(IV) isopropoxide) and titanium tetrachloride ($TiCl_4$). Examples of alumina precursors include aluminum alkoxides (e.g., aluminum isopropoxide) and aluminum salt mixtures with organics resulting in sol-gel formation. Examples of zirconia precursors include zirconium alkoxides (e.g., zirconium ethoxide). Examples of silica precursors include tetraethyl orthosilicate (TEOS) and tetramethyl orthosilicate. In some implementations, the nanofibers may include fibrils having two or more different compositions, in which case two or more different inorganic precursors may be utilized. Other hydrolysable, decomposable or reactive metal compounds, such as methoxides, ethoxides and sec-butoxide for example, may also serve as inorganic precursors.

The mechanism by which the inorganic compound is formed will depend on the inorganic precursor and chemical or physical conversion process utilized. In some implementations, the inorganic compound is formed by reacting the inorganic precursor with an appropriate reagent. For example, the orthosilicates and many metal alkoxides hydrolyze with water to form inorganic oxides. The reagent may be a liquid or a gas (or vapor). In some implementations, a liquid reagent is added to the dispersion medium before introducing the mixture, while introducing the mixture, after introducing the mixture, or during two or more of the foregoing stages. In these implementations, the dispersion medium may include both the antisolvent and the reagent. Alternatively, depending on the inorganic precursor, the antisolvent may be effective as a reagent and thus serves a dual role in the dispersion medium, acting both as an antisolvent for the polymer solvent and as a reagent for interacting with the inorganic precursor to form the inorganic compound that comprises the fibrils of the final composite nanofibers. Water is an example of an antisolvent that may serve this dual role, again depending on the inorganic precursor.

In other implementations, the composite nanofibers (containing fibrils composed of the inorganic precursor) may first be separated (removed) from the dispersion medium and then exposed to the reagent. In the case of a liquid reagent, exposure may entail introducing the composite nanofibers into a solution containing the reagent. In the case of a gaseous reagent, exposure may entail introducing the composite nanofibers into an atmosphere or environment containing the reagent. The atmosphere or environment may be controlled or enclosed, such as a reaction chamber or vessel. In cases where water is an effective reagent, the reactivity of the inorganic precursor with water may be high enough that simply exposing the composite nanofibers to ambient air of sufficient humidity is sufficient to convert the inorganic precursor to the inorganic compound.

In some implementations, the reaction between the inorganic precursor and the reagent may be initiated, promoted, or otherwise assisted by an appropriate catalyst, depending on the type of inorganic precursor utilized.

In other implementations, the inorganic compound is formed by irradiating the inorganic precursor with thermal energy (e.g., heating) or electromagnetic energy (e.g., UV light, laser light, etc.). In implementations that include the calcination step, the heat provided by the calcining device may serve as an effective energy input for converting the inorganic precursor to the inorganic compound. In one example in which the inorganic precursor is Ti(IV) isopropoxide, calcining the inorganic fibrils results in the formation of titania fibrils in which the titania is predominantly the anatase phase of titania. As used herein, the term "predominantly" means that ~90-95% or greater of the fibrils are composed of the anatase phase.

In other implementations, the inorganic compound is formed from the inorganic precursor by a combination of reaction with a reagent and exposure to thermal or electromagnetic energy.

In implementations in which the composite inorganic/polymer nanofibers, and not the pure inorganic fibrils, are the end product, the composite inorganic/polymer nanofibers may find a wide variety of applications. Composite nanofibers may obtain part or much of their desirable mechanical properties from the polymer, including toughness and flexibility. Polymers may also provide special electrical (e.g., conductive, semiconductive) properties, optical properties (absorption, fluorescence, light emission), and surface chemical functionalities (e.g., for conjugating growth factors in the case of tissue scaffolds). Some polymers, such as polyacrylonitrile, poly(N-isopropylacrylamide) (PNIPAm), and polyvinylidene difluoride, may allow fibers to respond mechanically to a number of different stimuli.

In implementations in which the pure inorganic fibrils are the end product, the present method entails the use of a sacrificial polymer material that serves as a structural mold for defining the polymer/inorganic composite fibers, but is later removed by calcination. Therefore, in addition to its ability to form fibers, the polymer should be as inexpensive as possible. Polystyrene, for instance, is a high-volume use polymer, comprising a large percentage of disposable foam products (e.g., Styrofoam® cups) though unsuitable for use in melt-spinning for production of fibers. The present method offers the possibility of making much higher value products (inorganic fibers) using this inexpensive commodity polymer. In addition to the use of the virgin raw material, during recycling polystyrene is commonly separated from other polymers using solvents, recovered, and re-used into low value products again. The present method offers the possibility of forming high value fiber products using recycled polystyrene and other recyclable polymers as well.

The ability to produce inorganic fibrils provided by the present method dramatically extends the range of materials that may be provided in the form of nanofibers (i.e., fibrils). For example, bioceramics are increasingly being explored for tissue engineering scaffolds, though mostly in research environments because of their extremely high cost, which is due to a low production rate by the previously known methods. Bioglass supports, which can deliver unique combinations of minerals to growing tissues, have a number of biomedical applications. The nanospinning techniques disclosed herein may potentially increase the production rate of such materials by orders of magnitude and dramatically decrease production cost, and therefore have significant commercial potential. Even common minerals such as calcite and calcium phosphate are highly desired in a nanofiber form. Other applications include the fabrication of semiconductor fibers for photovoltaics and photocatalysts.

Example

Fabrication of Composite Inorganic/Polymer Nanofibers

In this Example, a lab scale Couette flow apparatus, similar to the apparatus 100 illustrated in FIG. 1, was utilized to fabricate composite inorganic/polymer nanofibers. The annular volume (between the inner cylinder and outer cylinder) was 14 mL, and the gap between the inner cylinder and outer cylinder was 2.3 mm. The inner cylinder was rotated at 2,000 RPM. The polymer utilized was polystyrene (PS) ($M_w$=192,000 Da) obtained from Sigma (catalog #430102). The inorganic precursor utilized was Ti(IV) isopropoxide (TIIP), obtained from Sigma (97%, catalog #205273). A 13.5% PS (w/w), 7.6% TIPP (w/w) solution in chloroform was prepared under inert ($N_2$) atmosphere. A dispersion medium composed of 75% glycerol/25% EtOH (v/v) (viscosity=0.15 Pa·s (Pascal-second)) was added to the apparatus to a volume of 6.5-6.6 mL. In this example the glycerol controls the viscosity of the dispersion medium, while the ethanol is miscible with the polymer solvent and provides a way for the solvent to leave the forming fibers and form stable fibers (see FIG. 2). Dry 100% ethanol was utilized to prevent a hydrolysis reaction with TIPP before the fibers were formed. A volume of 0.1-0.2 mL of the polymer solution/inorganic precursor mixture (PS/TIIP/CHCl$_3$ solution) was injected into the dispersion medium while the dispersion medium was being sheared at the above-noted rotation rate. The resulting shear stress applied to the dispersed PS/TIIP mixture was about 65 Pa. The nanofibers formed were washed with dry 100% ethanol and left to dry in air at room temperature. It is believed that because the glycerol/ethanol media contained a small amount of water, conversion to the inorganic compound was initiated by hydrolysis in the solution, and humidity and oxygen from the air contributed to the final conversion. In other cases (depending for example on the composition of the polymer and inorganic precursor utilized), conversion may not be complete or even initiated until the nanofibers are subsequently exposed to a specific reagent.

Figure 9:
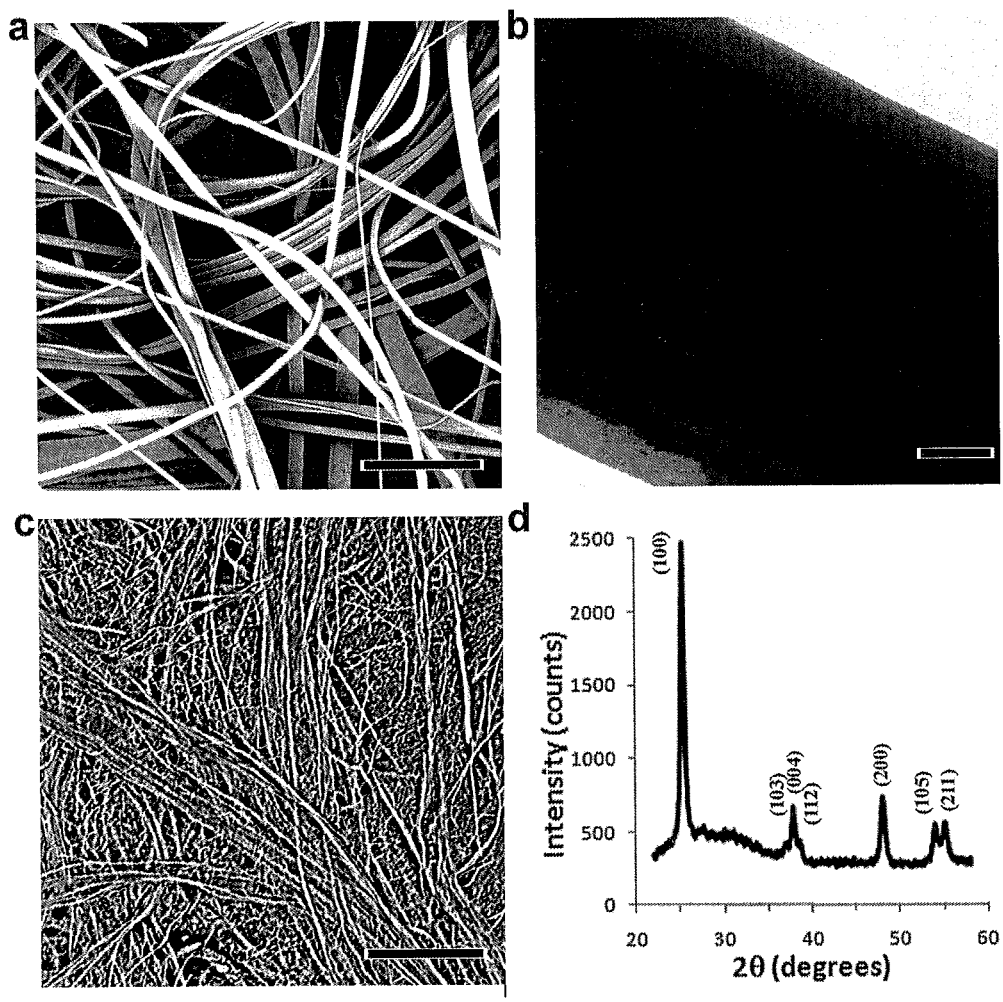
FIGS. 9A to 9D illustrate the following.

FIG. 9A is an SEM micrograph of the overall composite fiber morphology. FIG. 9B is a TEM micrograph of a single fiber from FIG. 9A, revealing the phase separation of the PS and titania phases inside it, as indicated by the stripes of varying electron density.

The nanofibers fabricated in this Example were subsequently placed in an oven set to 515° C. and calcined in air for eighteen hours. As shown in the SEM micrograph of FIG. 9C, the PS was removed completely and only titania nanofibers 50-200 nm in diameter remained. FIG. 9D is an X-ray diffraction (XRD) of the resulting TiO$_2$ fibrils. All of the peaks shown in FIG. 9D are referenced to specific anatase diffraction planes, demonstrating that the TiO$_2$ fibrils are composed of the more catalytically-active anatase phase of titania.

As evident from the foregoing descriptions, methods disclosed herein enable the formation of composite fibers from precursors in essentially a single step, without separate synthesis for any components. Methods disclosed herein enable the formation of composites with bi-continuous morphology, where each type of component may form a continuous structure over the length of the fiber. Such structures could be particularly useful for next generation solar cells and tissue engineering scaffolds. Additionally, the sol-gel method allows for the creation of pure inorganic semiconductor nanofibers by removing the organic polymer component from the composites by calcinations at high temperature. This capability is promising for the creation of inexpensive, yet highly efficient, thin layer photovoltaics.

Examples of Additional Embodiments

Additional embodiments provided in accordance with the presently disclosed subject matter include, but are not limited to, the following:

1. A method for fabricating composite inorganic/polymer nanofibers, the method comprising:

introducing a mixture of a polymer solution and an inorganic precursor into a dispersion medium to form a dispersion system comprising the dispersion medium and a plurality of dispersed-phase components of the mixture, wherein the polymer solution comprises a polymer dissolved in a polymer solvent, and the dispersion medium comprises an anti-solvent for the polymer such that the polymer solvent is miscible with the anti-solvent; and shearing the dispersion system such that the dispersed-phase components elongate and the polymer solvent diffuses out from the dispersed-phase components into the dispersion medium to form a plurality of composite nanofibers insoluble in the dispersion medium, and such that phase separation occurs between the polymer and the inorganic precursor wherein a plurality of inorganic fibrils are formed in each nanofiber; and forming an inorganic compound from the inorganic precursor, wherein the inorganic fibrils comprise the inorganic compound.

2. A method for fabricating inorganic fibrils, the method comprising:

introducing a mixture of a polymer solution and an inorganic precursor into a dispersion medium to form a dispersion system comprising the dispersion medium and a plurality of dispersed-phase components of the mixture, wherein the polymer solution comprises a polymer dissolved in a polymer solvent, and the dispersion medium comprises an anti-solvent for the polymer such that the polymer solvent is miscible with the anti-solvent;

shearing the dispersion system such that the dispersed-phase components elongate and the polymer solvent diffuses out from the dispersed-phase components into the dispersion medium to form a plurality of composite nanofibers insoluble in the dispersion medium, and such that phase separation occurs between the polymer and the inorganic precursor wherein a plurality of inorganic fibrils are formed in each nanofiber;

forming an inorganic compound from the inorganic precursor, wherein the inorganic fibrils comprise the inorganic compound; and removing the polymer from the inorganic fibrils.

3. The method of any of the foregoing embodiments, wherein the composite nanofibers have an average diameter ranging from 40 nm to 5 µm.

4. The method of any of the foregoing embodiments, wherein the composite nanofibers have an aspect ratio of 100 or greater.

5. The method of any of the foregoing embodiments, wherein the composite nanofibers are solid, hollow, or porous.

6. The method of any of the foregoing embodiments, wherein the polymer is a combination of two or more different polymers.

7. The method of any of the foregoing embodiments, wherein the polymer is selected from the group consisting of polystyrene, cellulose, cellulose acetate, polyacrylonitrile, polyvinylidene difluoride, conjugated semiconductor polymers, conjugated conductive polymers, and a combination of two or more of the foregoing.

8. The method of any of the foregoing embodiments, wherein the polymer solvent includes a combination of two or more different polymer solvents.

9. The method of any of the foregoing embodiments, wherein the dispersion medium includes a combination of two or more different antisolvents.

10. The method of any of the foregoing embodiments, wherein the mixture is introduced into the dispersion medium in the form of pre-formed dispersed-phase components as an emulsion.

11. The method of any of the foregoing embodiments, comprising introducing an additive to the dispersion medium wherein the composite nanofibers comprise the polymer, the inorganic fibrils, and the additive retained by the polymer, and wherein introducing occurs at a time selected from the group consisting of: before introducing the mixture into the dispersion medium, while introducing the mixture into the dispersion medium, after introducing the mixture into the dispersion medium, and combinations of two or more of the foregoing.

12. The method of embodiment 11, wherein the additive is selected from the group consisting of quantum dots, semiconductor particles, clay particles, ceramics, metals, metal alloys, metal oxides, metalloids, metalloid oxides, magnetic materials, graphite, graphene, carbon black, carbon nanotubes, colorants, odorants, deodorants, plasticizers, lubricants, surfactants, crosslinking agents, therapeutically active materials, biological materials, catalytic materials, enzymatic materials, and combinations of two or more of the foregoing.

13. The method of any of the foregoing embodiments, wherein the dispersion system is contained in a volume defined by an inner boundary and an outer boundary surrounding the inner boundary and spaced from the inner boundary by a gap, and shearing comprises moving at least one of the inner boundary and the outer boundary relative to the other.

14. The method of embodiment 13, wherein the gap is a radial gap, and further comprising oscillating the inner boundary along an axial direction while shearing.

15. The method of embodiment 13 or 14, wherein introducing the mixture is selected from the group consisting of flowing the mixture from a dispensing device separate from the inner boundary and the outer boundary, flowing the mixture through one or more apertures of the inner boundary, and both of the foregoing.

16. The method of any of embodiments 13-15, comprising controlling a shear stress applied to the dispersion system while shearing by controlling a parameter selected from the group consisting of a viscosity of the dispersion medium, a velocity at which the inner boundary or the outer boundary is moved relative to the other, the magnitude of the gap, and combinations of two or more of the foregoing.

17. The method of any of the foregoing embodiments, comprising controlling a shear stress applied to the dispersion system while shearing by controlling a parameter selected from the group consisting of a viscosity of the dispersion medium, a shear rate at which the dispersion system is sheared, and both the viscosity and the shear rate.

18. The method of any of the foregoing embodiments, comprising applying an electrical field to the dispersion system while shearing.

19. The method of any of the foregoing embodiments, wherein shearing the dispersion system comprises applying a shear stress ranging from about 30 Pa to about 100 Pa.

20. The method of any of the foregoing embodiments, wherein shearing occurs under room temperature conditions.

21. The method of any of the foregoing embodiments, comprising separating the composite nanofibers from the dispersion medium.

22. The method of any of the foregoing embodiments, wherein the dispersion medium has a viscosity of 1 cP or greater.

23. The method of any of the foregoing embodiments, wherein the dispersion medium has a viscosity ranging from 1 cP to 1500 cP.

24. The method of any of the foregoing embodiments, wherein the ratio of viscosity of the polymer solution to viscosity of the dispersion medium ranges from 0.1 to 100.

25. The method of any of the foregoing embodiments, wherein the ratio of viscosity of the polymer solution to viscosity of the dispersion medium ranges from 0.1 to 1.

26. A composite inorganic/polymer nanofiber fabricated according to the method of any of the foregoing embodiments.

27. A nonwoven article comprising a plurality of composite inorganic/polymer nanofibers fabricated according to the method of any of the foregoing embodiments.

28. A yarn comprising a plurality of twisted composite inorganic/polymer nanofibers fabricated according to the method of any of the foregoing embodiments.

29. An inorganic fibril fabricated according to the method of any of the foregoing embodiments.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for fabricating composite inorganic/polymer nanofibers, the method comprising: introducing a mixture of a polymer solution and an inorganic precursor into a dispersion medium to form a dispersion system comprising the dispersion medium and a plurality of dispersed-phase components of the mixture, wherein the polymer solution comprises a polymer dissolved in a polymer solvent, and the dispersion medium comprises an anti-solvent for the polymer such that the polymer solvent is miscible with the anti-solvent; forming a plurality of composite nanofibers by shearing the dispersed-phase components, wherein phase separation occurs between the polymer and the inorganic precursor such that a plurality of inorganic fibrils are formed in each nanofiber; and forming an inorganic compound from the inorganic precursor, wherein the inorganic fibrils comprise the inorganic compound.

2. The method of claim 1, wherein the polymer of the composite nanofibers has a molecular weight of 10,000 Da or greater.

3. The method of claim 1, wherein the inorganic precursor is selected from the group consisting of titania precursors, silica precursors, alumina precursors, zirconia precursors, bioceramic precursors, bioactive glass precursors, methoxides, ethoxides, sec-butoxides, and a combination of two or more of the foregoing.

4. The method of claim 1, wherein the inorganic precursor comprises a hydrolysable metal compound.

5. The method of claim 1, wherein the dispersion medium has a viscosity of 1 cP or greater.

6. The method of claim 1, wherein the ratio of viscosity of the polymer solution to viscosity of the dispersion medium ranges from 0.1 to 100.

7. The method of claim 1, comprising introducing an additive to the dispersion medium wherein the composite nanofibers comprise the polymer, the inorganic fibrils, and the additive retained by the polymer, and wherein introducing occurs at a time selected from the group consisting of: before introducing the mixture into the dispersion medium, while introducing the mixture into the dispersion medium, after introducing the mixture into the dispersion medium, and combinations of two or more of the foregoing.

8. The method of claim 1, wherein the dispersion system is contained in a volume defined by an inner boundary and an outer boundary surrounding the inner boundary and spaced from the inner boundary by a gap, and shearing comprises moving at least one of the inner boundary and the outer boundary relative to the other.

9. The method of claim 8, comprising controlling a shear stress applied to the dispersed-phase components while shearing by controlling a parameter selected from the group consisting of a viscosity of the dispersion medium, a velocity at which the inner boundary or the outer boundary is moved relative to the other, the magnitude of the gap, and combinations of two or more of the foregoing.

10. The method of claim 1, comprising controlling a shear stress applied to the dispersed-phase components while shearing by controlling a parameter selected from the group consisting of a viscosity of the dispersion medium, a shear rate at which the dispersed-phase components is sheared, and both the viscosity and the shear rate.

11. The method of claim 1, comprising controlling an average diameter of the as-formed nanofibers by controlling a shear stress applied to the dispersed-phase components while shearing.

12. The method of claim 1, wherein shearing the dispersed-phase components comprises applying a shear stress ranging from about 10 Pa to about 1000 Pa.

13. The method of claim 1, wherein the mixture is introduced at a ratio of the polymer solution to the inorganic precursor ranging from 1:10,000 to 10,000:1 by weight.

14. The method of claim 1, wherein forming the inorganic compound comprises reacting the inorganic precursor with a reagent.

15. The method of claim 14, wherein forming the inorganic compound comprises performing a step selected from the group consisting of: adding the reagent to the dispersion medium before introducing the mixture; adding the reagent to the dispersion medium while introducing the mixture; adding the reagent to the dispersion medium after introducing the mixture; separating the composite nanofibers from the dispersion medium and exposing the separated composite nanofibers to the reagent; and a combination of two or more of the foregoing.

16. The method of claim 1, wherein forming the inorganic compound comprises irradiating the inorganic precursor with thermal or electromagnetic energy.

* * * * *